US012343693B2

(12) United States Patent
Henry et al.

(10) Patent No.: US 12,343,693 B2
(45) Date of Patent: *Jul. 1, 2025

(54) STATIC MIXERS FOR CONTINUOUS FLOW CATALYTIC REACTORS

(71) Applicant: COMMONWEALTH SCIENTIFIC AND INDUSTRIAL RESEARCH ORGANISATION, Acton (AU)

(72) Inventors: William Henry, Clayton (AU); John Tsanaktsidis, Clayton (AU); Christian Hornung, Clayton (AU); Andrew Joseph Urban, Clayton (AU); Darren Fraser, Clayton (AU); Dayalan Romesh Gunasegaram, Clayton (AU); Michael David Horne, Clayton (AU); Jean-Pierre Veder, Clayton (AU); Theo Rodopoulos, Clayton (AU)

(73) Assignee: COMMONWEALTH SCIENTIFIC AND INDUSTRIAL RESEARCH ORGANISATION, Acton (AU)

( * ) Notice: Subject to any disclaimer, the term of this patent is extended or adjusted under 35 U.S.C. 154(b) by 667 days.

This patent is subject to a terminal disclaimer.

(21) Appl. No.: 17/683,078

(22) Filed: Feb. 28, 2022

(65) Prior Publication Data

US 2022/0258110 A1 Aug. 18, 2022

Related U.S. Application Data

(63) Continuation-in-part of application No. 16/064,995, filed as application No. PCT/AU2016/051267 on Dec. 21, 2016, now Pat. No. 11,541,412.

(30) Foreign Application Priority Data

Dec. 23, 2015 (AU) ................................ 2015905354
Oct. 3, 2016 (AU) ................................ 2016903998

(51) Int. Cl.
*B01F 25/431* (2022.01)
*B01J 23/755* (2006.01)
*B01F 101/00* (2022.01)
*B01J 37/34* (2006.01)
*B33Y 80/00* (2015.01)

(52) U.S. Cl.
CPC ........... *B01F 25/431* (2022.01); *B01J 23/755* (2013.01); *B01F 2101/2204* (2022.01); *B01J 37/348* (2013.01); *B33Y 80/00* (2014.12)

(58) Field of Classification Search
CPC .................................................. B01F 25/431
See application file for complete search history.

(56) References Cited

U.S. PATENT DOCUMENTS

| 4,062,524 A | 12/1977 | Brauner et al. |
| 4,220,416 A | 9/1980 | Brauner et al. |
| 4,397,893 A | 8/1983 | Bottoms |
| 4,400,309 A | 8/1983 | McMahon et al. |
| 5,071,634 A | 12/1991 | Maunula et al. |
| 5,162,288 A | 11/1992 | Stringaro |
| 6,299,810 B1 | 10/2001 | Blackinton, Jr. |
| 6,942,767 B1 | 9/2005 | Fazzina et al. |
| 7,887,764 B2 | 2/2011 | Jernberg |
| 8,119,554 B2 | 2/2012 | Kashani-Shirazi et al. |
| 11,541,412 B2 * | 1/2023 | Henry ................... B05B 7/1486 |
| 2004/0005403 A1 | 1/2004 | Nesbitt |
| 2007/0017633 A1 | 1/2007 | Tonkovich et al. |
| 2007/0237692 A1 | 10/2007 | Burd |
| 2007/0259099 A1 | 11/2007 | Van Sciver |
| 2011/0078896 A1 | 4/2011 | Calla et al. |
| 2014/0072481 A1 | 3/2014 | Scahill |
| 2014/0183054 A1 | 7/2014 | Legzdins |
| 2014/0236281 A1 | 8/2014 | Lee et al. |

FOREIGN PATENT DOCUMENTS

| CN | 1432033 A | 7/2003 |
| CN | 101309747 A | 11/2008 |
| EP | 0894523 A1 | 2/1999 |
| EP | 1837070 A1 | 9/2007 |
| EP | 2011562 A1 | 1/2009 |
| FR | 2770156 A1 | 4/1999 |
| GB | 1526322 A | 9/1978 |
| GB | 2202552 A | 9/1988 |
| GB | 2217732 A | 11/1989 |

(Continued)

OTHER PUBLICATIONS

Miyara,S., "Static Mixer—Basic Knowledge and Application," Textile Industry Press, 1st edition, pp. 167-168, figures 4-64 (1985).
Oldshue, J.Y., "Fluid Mixing Technology," Chemical Industry Press, 1st edition, pp. 281, lines 20-25 (1991).
Hu et al., "Extraction of Oil & Fat Technology," China Commercial Publishing House, p. 183, lines 7-20 (1997).
International Search Report and Written Opinion of the International Searching Authority for International Patent application No. PCT/AU2016/051267 mailed Mar. 16, 2017, 21 pages.
Capel et al., "Design and additive manufacture for flow chemistry," Lab Chip 12:4583-4590 (2013).

(Continued)

*Primary Examiner* — Stuart L Hendrickson
(74) *Attorney, Agent, or Firm* — Haley Guiliano LLP; Karen Mangasarian; Maha M. Saber

(57) ABSTRACT

The present disclosure relates to catalytic static mixers comprising catalytic material. The static mixers can be configured for use with continuous flow chemical reactors, for example tubular continuous flow chemical reactors for heterogeneous catalysis reactions. This disclosure also relates to processes for preparing static mixers. This disclosure also relates to continuous flow chemical reactors comprising the static mixers, systems comprising the continuous flow chemical reactors, processes for synthesising products using the continuous flow reactors, and methods for screening catalytic materials using the static mixers.

27 Claims, 12 Drawing Sheets

(56) References Cited

FOREIGN PATENT DOCUMENTS

| | | | |
|---|---|---|---|
| JP | S4943891 | A | 4/1974 |
| JP | S53114773 | A | 10/1978 |
| JP | H02143010 | A | 6/1990 |
| JP | H02275704 | A | 11/1990 |
| JP | H0841010 | A | 2/1996 |
| JP | 2007278689 | A | 10/2007 |
| JP | 2008537904 | A | 10/2008 |
| JP | 2011501691 | A | 1/2011 |
| WO | WO2001074926 | A1 | 10/2001 |
| WO | WO2006102675 | A1 | 9/2006 |
| WO | WO2007070939 | A1 | 6/2007 |
| WO | WO2009109016 | A1 | 9/2009 |
| WO | WO2013156502 | A1 | 10/2013 |
| WO | WO2014070243 | A1 | 5/2014 |
| WO | WO2015157816 | A1 | 10/2015 |

OTHER PUBLICATIONS

Economou et al., "Two-Phase Mass Transfer in Channel Electrolyzers with Gas-Liquid Flow," J Electrochemical Society 132(3): 601-608 (1985).

Elias et al., "A porous structures reactor for hydrogenation reactions," Chemical Engineering and processing, 95: 175-185 (2015).

Ghanem et al., "Static mixers: Mechanisms, applications, and characterization methods—A review," Chemical Engineering Research and Design, 92: 205-228 (2014).

Jardini et al., "Nanocomposite Microreactor Fabricated by Indirect 3D Printing," 11 international Conference on Advanced Materials, 2 pgs (2009).

Thakur et al., "Static Mixers in the Process Industries—A Review," Trans IChemE, 81(A): 787-826 (2003).

Wang et al., "Characteristics of cold sprayed catalytic coating for hydrogen production through fuel reforming," International Journal of Hydrogen Energy, 35: 8206-8215 (2010).

* cited by examiner

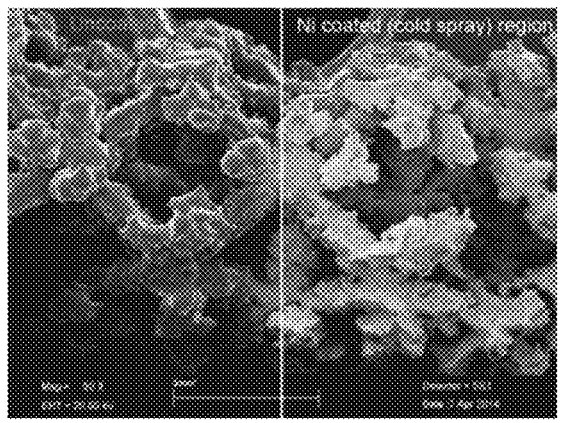 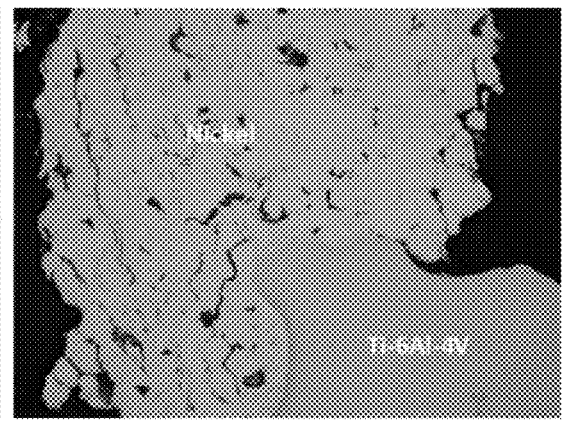
Figure 8A                    Figure 8B
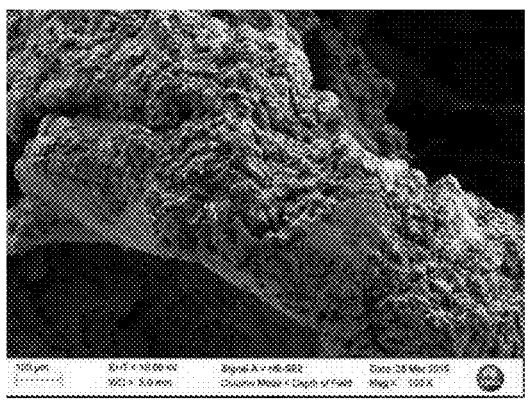 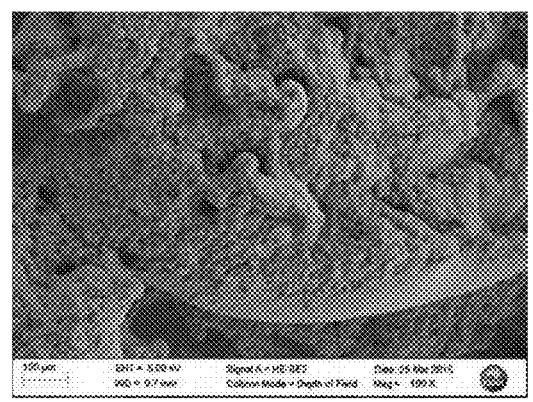
Figure 8C                    Figure 8D
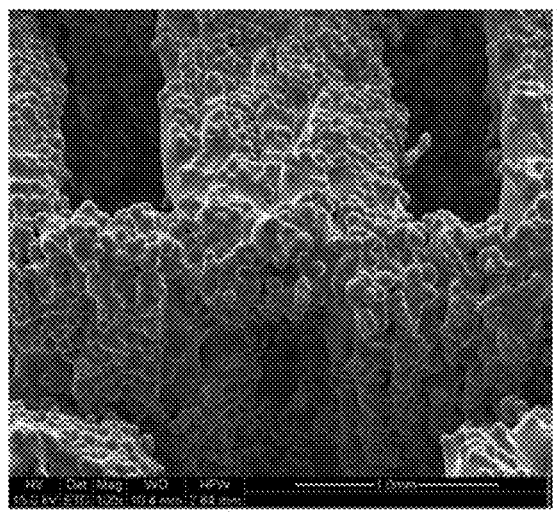 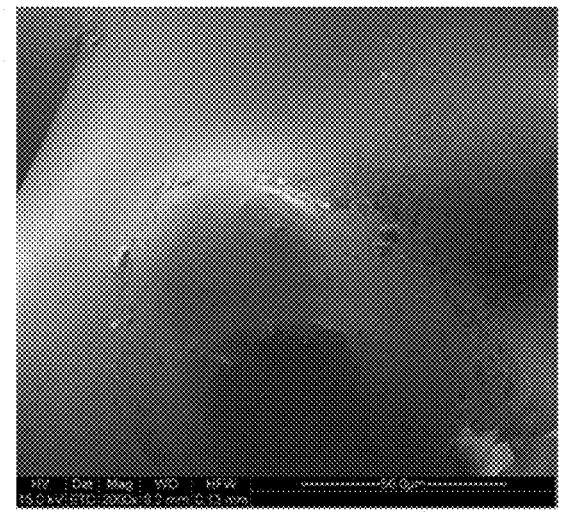
Figure 9A                    Figure 9B

STATIC MIXERS FOR CONTINUOUS FLOW CATALYTIC REACTORS

This application is a continuation-in-part application of U.S. patent application Ser. No. 16/064,995, filed Jun. 21, 2018, which is a United States National Phase Application filed under 35 U.S.C. § 371 of International Patent Application No. PCT/AU2016/051267, filed Dec. 21, 2016, which claims priority from and the benefit of Australian Patent Application No. 2016903998, filed Oct. 3, 2016 and Australian Patent Application No. 2015905354, filed Dec. 23, 2015. The contents and disclosures of each of the foregoing applications are incorporated by reference herein in their entireties.

FIELD

The present disclosure relates to catalytic static mixers comprising catalytic material. The static mixers can be configured for use with continuous flow chemical reactors, for example tubular continuous flow chemical reactors for heterogeneous catalysis reactions. This disclosure also relates to processes for preparing static mixers. This disclosure also relates to continuous flow chemical reactors comprising the static mixers, systems comprising the continuous flow chemical reactors, processes for synthesising products using the continuous flow reactors, and methods for screening catalytic materials using the static mixers.

BACKGROUND

Continuous flow chemical reactors generally comprise a tubular reaction chamber with reactant fluids being continuously fed into the reaction chamber to undergo a chemical reaction to continuously form products which flow out from the reaction chamber. The reaction chambers are typically submerged in a heating/coolant fluid, for example in a shell-and-tube heat exchanger configuration, to facilitate the transfer of heat to/away from the reaction.

Continuous flow reactors used in catalytic reactions typically employ packed bed reaction chambers in which the reaction chamber is packed with solid catalyst particles that provide catalytic surfaces on which the chemical reaction can occur. Static mixers are used for pre-mixing of fluid streams prior to contact with the packed bed reaction chambers and downstream of these chambers to transfer heat between the central and the outer regions of the reactor tubes. The static mixers comprise solid structures that interrupt the fluid flow to promote mixing of the reactants prior to reaction in the packed bed reaction chambers and for promoting desirable patterns of heat transfer downstream of these chambers. Static mixers are also used independent of packed beds since some reactants do not require a catalyst to activate their reaction.

Towards improving process productivity through increased reaction yields, there is a clear need for developing enhanced static mixers and/or reaction chambers for continuous flow chemical reactors that are readily removable and easily replaced, allow further re-design enhancement and are capable of providing more efficient mixing, heat transfer and catalytic reaction of reactant chemical and/or electrochemical reactants.

SUMMARY

The present inventors have undertaken significant research and development into alternative continuous flow chemical reactors and have identified that static mixers can be provided with a catalytic surface such that the resulting static mixer is capable of being used with a continuous flow chemical reactor. It was surprisingly found that incorporating catalytic material on the surface of additive manufactured static mixers can provide catalytic static mixers that can be configured to be readily removable and easily replaced, allow for further re-design enhancement, and provide for efficient mixing, heat transfer and catalytic reaction of reactants in continuous flow chemical reactors. The static mixers may be provided for use with in-line continuous flow reactors as inserts or as modular packages with the static mixer as an integral part of a section of the reactor tube itself.

Accordingly, in a first aspect there is provided a static mixer element configured as a module for a continuous flow chemical reactor chamber, wherein the static mixer element comprises a catalytically active scaffold defining a plurality of passages configured for mixing one or more fluidic reactants during flow and reaction thereof through the mixer, and wherein at least a portion of a surface of the scaffold comprises a catalytic material for providing the surface with catalytically reactive sites.

The static mixer element may be an additive manufactured static mixer. The static mixer element may be configured as a modular insert for assembly into a continuous flow reactor chamber. The module may provide the static mixer as an integral part of a section of the reactor.

In one embodiment, there is provided a static mixer element comprising catalytically reactive sites and an integral scaffold defining a plurality of similar structures repeated periodically along the longitudinal axis of the scaffold to form a continuous lattice of interconnected segments, each segment comprising apertures and passages arranged in multiple orientations to the net flow direction configured for enhancing mixing, contact of one or more fluidic reactants with the catalytically reactive sites, and heat transfer, by redistributing fluid in directions transverse to the net flow through the plurality of apertures and passages by changing or splitting the localized flow direction by more than 200/m, corresponding to a number of times within a given length along a longitudinal axis of the static mixer element, the volume displacement % of each static mixer element relative to a reactor chamber section for housing the static mixer element being in a range of 23 to 70%.

In another embodiment, there is provided a continuous flow chemical reactor for use in reaction of one or more fluidic reactants, the reactor comprising:
  one or more reaction chamber sections in fluidic communication with each other, each reaction chamber section housing a removable static mixer element configured as an integral module for insertion into each reaction chamber section, wherein the aspect ratio (L/d) of the reactor is at least about 50,
  each static mixer element is an elongated integral structure comprising catalytically reactive sites and an integral scaffold defining a plurality of similar structures repeated periodically along the longitudinal axis of the scaffold to form a continuous lattice of interconnected segments, each segment comprising a plurality of apertures and passages arranged in multiple orientations to the net flow direction configured for enhancing mixing, contact of the fluidic reactants with the catalytically reactive sites and heat transfer, by redistributing fluid in directions transverse to the net flow through the plurality of apertures and passages by changing or splitting the localized flow direction by more than 200/m, corresponding to a number of times within a given length along a longitudinal axis of the static mixer element, the volume displacement % of each static mixer element relative to each tubular reactor chamber section for housing the static mixer element being in a range of 23 to 70%, and, in use, configured to provide a transverse temperature differential of less than about 10° C./mm and a pressure drop across the reaction chamber section (in Pa/m) of less than about 100,000 with a volumetric flow rate of at least 0.1 ml/min;

one or more reactant inlets for supply of the one or more fluidic reactants to the one or more tubular chamber sections; and one or more outlets in fluidic communication with the static mixer element for receiving an output stream comprising a product of the reaction.

In a second aspect there is provided a process for preparing a static mixer element for a continuous flow chemical reactor chamber, comprising the steps of:

providing a static mixer element comprising a scaffold defining a plurality of passages configured for mixing one or more fluidic reactants during flow and reaction thereof through the mixer; and applying a catalytic coating to at least a portion of the surface of the scaffold.

The step of applying the catalytic coating to at least a portion of the surface of the scaffold may comprise or consist of electrodeposition or cold spray. The catalytic coating may comprise a catalytic material selected from at least one of a metal, metal alloy, cermet and metal oxide, for providing the surface with a plurality of catalytically reactive sites. The process may comprise a step of preparing the scaffold of the static mixer by additive manufacture. The material of the scaffold may be selected from at least one of a metal, metal alloy, cermet and metal oxide.

In one embodiment, there is provided a process for preparing a removable static mixer element for a continuous flow chemical reactor chamber, comprising the steps of:

providing a static mixer element configured as an integral module for housing within a reaction chamber section, the integral module comprising an integral scaffold defining a plurality of apertures and passages; and applying a catalytic coating to at least a portion of the surface of the scaffold to provide the surface with a plurality of catalytically reactive sites, each static mixer element is an elongated integral structure comprising catalytically reactive sites and an integral scaffold defining a plurality of similar structures repeated periodically along the longitudinal axis of the scaffold to form a continuous lattice of interconnected segments, each segment comprising apertures and passages arranged in multiple orientations to the net flow direction configured for enhancing mixing, contact of one or more fluidic reactants with the catalytically reactive sites, and heat transfer, by redistributing fluid in directions transverse to the net flow through the plurality of apertures and passages by changing or splitting the localized flow direction by more than 200/m, corresponding to a number of times within a given length along a longitudinal axis of the static mixer element, the volume displacement % of each static mixer element relative to a reactor chamber section for housing the static mixer element being in a range of 23 to 70%, and, in use, configured to provide a transverse temperature differential of less than about 10° C./mm and a pressure drop across the reaction chamber section (in Pa/m) of less than about 100,000 with a volumetric flow rate of at least 0.1 ml/min.

In a third aspect there is provided a continuous flow chemical reactor for use in reaction of one or more fluidic reactants comprising one or more static mixer elements according to any embodiment as described herein.

In a fourth aspect there is provided a system for providing a continuous flow chemical reaction comprising:

a continuous flow chemical reactor comprising a static mixer according to any embodiment as described herein;

a pump for providing fluidic flow for one or more fluidic reactants and any products thereof through the reactor;

one or more heat exchangers to allow for control of the temperature of the reactor, chamber section, static mixer; or fluidic components thereof; and a controller for controlling one or more of the parameters of the system selected from concentration, flow rate, temperature, pressure, and residence time, of the one or more fluidic reactants, or sources or products thereof.

In a fifth aspect there is provided a process for synthesizing a product by catalytic reaction of one or more fluidic reactants, the process comprising the steps of:

providing a continuous flow chemical reactor comprising a static mixer element or system according to any embodiment as described herein;

providing at least a first fluidic reactant to the reactor via the one or more reactant inlets;

operating the chemical reactor, or control means thereof, to provide flow and catalytic reaction of the at least first fluidic reactant through the static mixer; and obtaining an output stream comprising a product of a catalytic reaction of the at least first reactant.

In a sixth aspect there is provided a method of screening a catalyst material for catalytic reactivity using a static mixer element or system according to any embodiment as described herein, comprising the steps of:

operating a continuous flow chemical reactor comprising the static mixer with a predetermined catalyst material at a predetermined reactor setting; and determining the yield of product obtained from an output stream.

In a seventh aspect there is provided a process for design and manufacture of a catalytic static mixer (CSM) element for a continuous flow chemical reactor chamber comprising the steps of:

designing a prototype static mixer element comprising a scaffold defining a plurality of passages configured for mixing one or more fluidic reactants during flow and reaction thereof through the mixer;

additive manufacturing the prototype static mixer element;

applying a catalytic coating to the surface of the scaffold of the prototype static mixer element to form a prototype catalytic static mixer (CSM) element;

testing the prototype CSM for at least one of suitability for catalytic coating or operational performance and durability in a continuous flow chemical reactor;

redesigning the static mixer element to enhance at least one of suitability for catalytic coating or operational performance and durability in a continuous flow chemical reactor; and manufacturing the redesigned static mixer element comprising a redesigned scaffold defining a plurality of passages configured for mixing one or more fluidic reactants during flow and reaction thereof through the mixer, and applying a catalytic coating to the surface of the scaffold to form the catalytic static mixer (CSM) element.

In an eighth aspect there is provided a static mixer element comprising catalytically reactive sites and an integral scaffold defining a plurality of similar structures repeated periodically along the longitudinal axis of the scaffold to form a continuous lattice of interconnected segments, each segment comprising apertures and passages arranged in multiple orientations to the net flow direction configured for enhancing mixing, contact of one or more fluidic reactants with the catalytically reactive sites, and heat transfer, by redistributing fluid in directions transverse to the net flow through the plurality of apertures and passages by changing or splitting the localized flow direction by more than 200/m, corresponding to a number of times within a given length along a longitudinal axis of the static mixer element, the volume displacement % of each static mixer element relative to a reactor chamber section for housing the static mixer element being in a range of 23 to 70%, wherein the static mixer element is an elongated integral structure. In an embodiment, each segment may comprise apertures and passages arranged in at least 3 orientations within a segment. In another embodiment, each segment may comprise polygonal prisms, helical segments or helicoid structures providing a plurality of apertures and passages. The aspect ratio (L/d) of each static mixer element may be at least 15. The aspect ratio (L/d) of each static mixer element may be at least 25.

In another embodiment, there is provided a continuous flow chemical reactor for use in reaction of one or more fluidic reactants, the reactor comprising:
  one or more reaction chamber sections in fluidic communication with each other, each reaction chamber section housing a removable static mixer element configured as an integral module for insertion into each reaction chamber section
  each static mixer element is an elongated integral structure comprising catalytically reactive sites and an integral scaffold formed of interlinking repeating component frame structures arranged with an orientation that varies as a function of position along the longitudinal axis, the interlinking repeating component frame structures defining apertures, permeable by fluid;
  one or more reactant inlets for supply of the one or more fluidic reactants to the one or more tubular chamber sections; and
  one or more outlets in fluidic communication with the static mixer element for receiving an output stream comprising a product of the reaction.

Optionally, the aspect ratio (L/d) of the reactor is at least about 50.

Optionally, the frame structures are a plurality of matching or similar structures repeated periodically along the longitudinal axis of the scaffold to form a continuous lattice of interconnected segments, each segment comprising a plurality of apertures and passages arranged in multiple orientations to the net flow direction.

Optionally, the frame structures are configured for enhancing mixing, contact of the fluidic reactants with the catalytically reactive sites and heat transfer, by redistributing fluid in directions transverse to the net flow through the plurality of apertures and passages.

Optionally, the frame structures are configured for enhancing mixing by changing or splitting the localized flow direction by more than 200/m, corresponding to a number of times within a given length along a longitudinal axis of the static mixer element, the volume displacement % of each static mixer element relative to each tubular reactor chamber section for housing the static mixer element being in a range of 23 to 70%, and, in use, configured to provide a transverse temperature differential of less than about 10° C./mm and a pressure drop across the reaction chamber section (in Pa/m) of less than about 100,000 with a volumetric flow rate of at least 0.1 ml/min.

Further embodiments of the above the above aspects are described below.

BRIEF DESCRIPTION OF THE DRAWINGS

Preferred embodiments of the present disclosure will now be further described and illustrated, by way of example only, with reference to the accompanying drawings in which:

FIGS. 8A and 8B show the difference between the coated and uncoated surfaces and (a cross-section respectively) of a static mixer coated with a catalyst using cold spray deposition, according to one example;

FIGS. 8C and 8D show detailed images of surfaces of a static mixer coated with catalytic material using cold spraying, according to one example;

FIGS. 9A and 9B show detailed images of surfaces of a static mixer coated with catalytic material using electrodeposition, according to one example;

DETAILED DESCRIPTION

Figure 1:
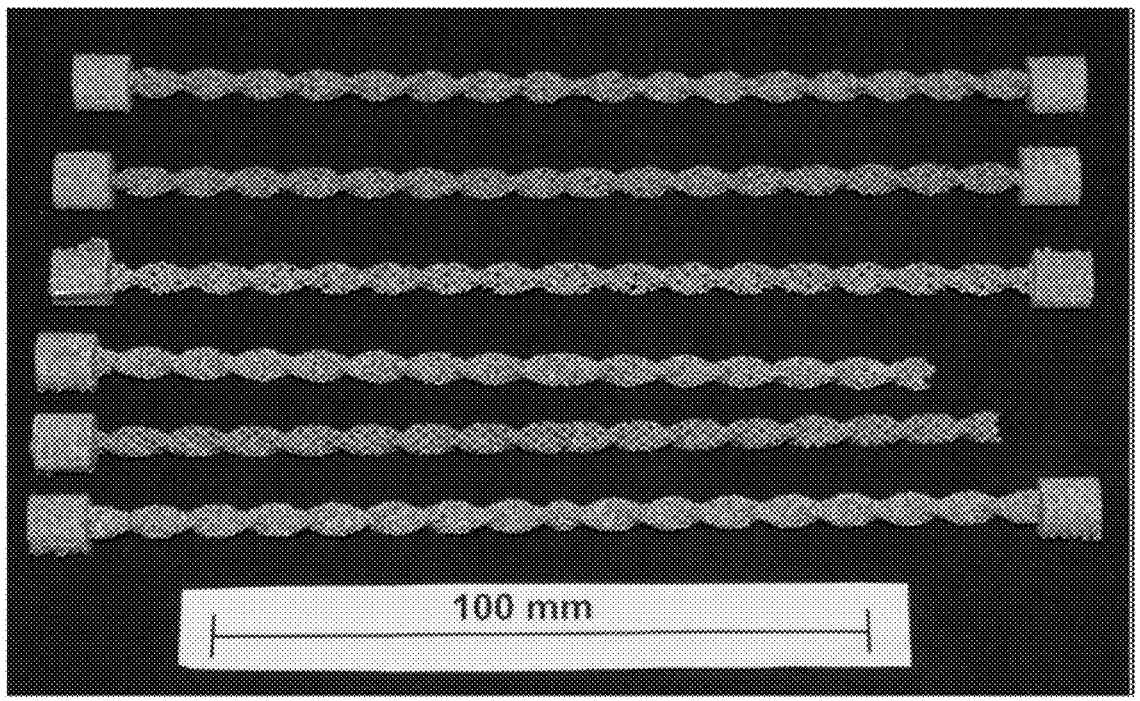
FIG. 1 shows a number of different static mixers according to some embodiments.
Figure 2:
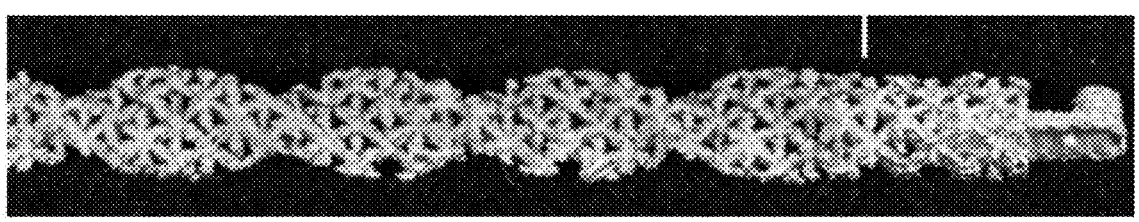
FIG. 2 shows a static mixer according to some embodiments.

The present disclosure describes the following various non-limiting embodiments, which relate to investigations undertaken to identify static mixers capable of being readily removable and easily replaced, allowing further re-design enhancement and providing efficient mixing, heat transfer and catalytic reaction of reactants for use with continuous flow chemical reactors. It was surprisingly found that incorporating catalytic material on the surface of additive manufactured static mixers can provide efficient mixing, heat transfer and catalytic reaction of reactants in continuous flow chemical reactors. The continuous flow chemical reactors comprising the static mixers developed using additive manufacturing can also be operated at commercially relevant flow rates, and may also provide such operation with manageable back pressures (an indicator of the resistance to flow) as described in further detail below. According to at least some embodiments described herein, the static mixers can advantageously be configured and used with in line continuous flow reactors as inserts or as modular packages with the static mixer as an integral part of a section of the reactor tube itself. Further advantages of the static mixers, at least according to some embodiments as disclosed herein, is that they can be configured and used with single pass in-line continuous flow reactors. The static mixers may be tubular and used with tubular continuous flow chemical reactors.

Static mixers have traditionally been directed to mixing fluidic components, and when used with chemical reactors, as pre-mixing elements prior to reactions using packed bed systems. As mentioned, chemical reactors typically use packed bed systems and therefore are not directed to higher flow rate operations in which the present static mixers can operate.

Compared to current heterogeneous catalysis systems, such as packed beds, the present static mixers have been shown to provide various advantages. Additive manufacturing technology (i.e. 3D printing) enables flexibility in re-design and configuration of the static mixers, although presents other difficulties and challenges in providing robust commercially viable scaffolds that can be catalytically coated to operate under certain operational performance parameters of continuous flow chemical reactors, such as to provide desirable mixing and flow conditions inside the continuous flow reactor, and enhanced heat and mass transfer characteristics and reduced back pressures compared to packed bed systems. In addition, electro-deposition and cold spray techniques have been found to be surprisingly suitable for catalytically coating the static mixers and were suitable for application with a wide variety of metal catalysts.

As described further below, the static mixers can be configured as elements to provide inserts for use with in-line continuous flow reactor systems. The static mixers can also provide heterogeneous catalysis, which is of significant importance to chemical manufacturing and is broad ranging including the production of fine and specialty chemicals, pharmaceuticals, food and agrochemicals, consumer products, and petrochemicals. Further details and embodiments of the static mixer inserts are described below.

Specific Terms

"Element" refers to an individual unit that can be used together with one or more other components in forming a continuous flow reactor system. Examples of an element include an "insert" or "module" as described herein.

"Single pass reactor" refers to a reactor used in a process or system where the fluidic components pass through the reactor on a single occasion and are not recycled back through the reactor from which they have already passed through.

"Aspect ratio" means the ratio of length to diameter (L/d) of a single unit or element.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Those skilled in the art will appreciate that the disclosure herein is susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations or any two or more of said steps or features.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be clearly understood that, although a number of prior art publications are referred to herein, this reference does not constitute an admission that any of these documents forms part of the common general knowledge in the art, in Australia or in any other country.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Static Mixers

It will be appreciated that the static mixers can provide an integral element for a chemical reactor chamber. The static mixer element for a continuous flow chemical reactor chamber may comprise a catalytically active scaffold defining a plurality of passages configured for dispersing and mixing one or more fluidic reactants during flow and reaction thereof through the mixer. It will be appreciated that at least a substantial part of the surface of the scaffold may comprise a catalytic material. The catalytic material may be selected from at least one of a metal, metal alloy, cermet and metal oxide, for providing the surface of the scaffold with catalytically reactive sites.

The continuous flow chemical reactors as described herein may comprise reaction chambers housing integral static mixers (e.g. catalytic static mixers) that are configured to provide higher flow rates with relatively low pressure and temperature drop, along with redistributing fluid by changing or splitting the localised flow direction by more than, for example, 200 $m^{-1}$, corresponding to a number of times within a given length along a longitudinal axis of the static mixer element. In one embodiment, the scaffold of the static mixer has a complex geometry and comprises a non-line-of sight structure including a plurality of apertures and passages in the surface of the static mixer providing passage for the fluid to flow through the scaffold. Advantageously, it is the plurality of apertures and passages in the surface of the static mixer configured for enhancing mixing, contact of the fluidic reactants with the catalytically reactive sites and heat transfer, by redistributing fluid in directions transverse to the main flow that allows for such enhanced localised turbulent mixing. This is in complete contrast to the traditional static mixers which include, for example, simple "line-of-sight" corrugated structures or sheets which can be stacked on top of one another to form a one piece assembly or a microchannel apparatus comprising surface features for mixing and chemical reactions.

The static mixer may be provided as one or more elements each configured for inserting into a continuous flow chemical reactor or reactor chamber thereof. The static mixer element may be configured as a modular insert for assembly into a continuous flow chemical reactor or chamber thereof. The static mixer element may be configured as an insert for an in-line continuous flow chemical reactor or chamber thereof. The in-line continuous flow chemical reactor may be a recycle loop reactor or a single pass reactor. In one embodiment, the in-line continuous flow chemical reactor is a single pass reactor.

The static mixer element may be configured for enhancing mixing and heat transfer characteristics for redistributing fluid in directions transverse to the main flow (e.g. net flow), for example in radial and tangential or azimuthal directions relative to a central longitudinal axis of the static mixer element. The static mixer element may be configured for at least one of (i) to ensure as much catalytic surface area as possible is presented to the flow so as to activate close to a maximum number of reaction sites and (ii) to improve flow mixing so that (a) the reactant molecules contact surfaces of the static mixer element more frequently and (b) heat is transferred away from or to the fluid efficiently. The static mixer element may be provided with various geometric configurations or aspect ratios for correlation with particular applications. The static mixer elements enable fluidic reactants to be mixed and brought into close proximity with the catalytic material for activation. The static mixer element may be configured for use with turbulent flow rates, for example enhancing turbulence and mixing, even at or near the internal surface of the reactor chamber housing. It will also be appreciated that the static mixer element can be configured to enhance the heat and mass transfer characteristics for both laminar and turbulent flows.

The configurations may also be designed to enhance efficiency, degree of chemical reaction, or other properties such as pressure drop (whilst retaining predetermined or desired flow rates), residence time distribution or heat transfer coefficients. As previously mentioned, traditional static mixers have not been previously developed to specifically address enhanced heat transfer requirements, which may result from the catalytic reaction environments provided by the present static mixers.

The configuration of the scaffold, or static mixer, may be determined using Computational Fluid Dynamics (CFD) software, which can be used for enhancing the configuration for mixing of reactants for enhanced contact and activation of the reactants, or reactive intermediates thereof, at the catalytically reactive sites of the scaffold. The CFD based configuration determinations are described in further detail in sections below.

The static mixer element, scaffold, or reactor chamber thereof, may be formed by additive manufacturing, as also described in sections below. The static mixer may be an additive manufactured static mixer. Additive manufacturing of the static mixer and subsequent catalytic coating can provide a static mixer that is configured for efficient mixing, heat transfer and catalytic reaction (of reactants in continuous flow chemical reactors), and in which the static mixer may be physically tested for reliability and performance, and optionally further re-designed and re-configured using additive manufacturing (e.g. 3D printing) technology. Additive manufacturing provides flexibility in preliminary design and testing, and further re-design and re-configuration of the static mixers to facilitate development of more commercially viable and durable static mixers. For example, each static mixer is a single build structure and not a modular unit that needs to be assembled to function as a static mixer element. It will be appreciated that each static mixer element is an elongated integral structure configured for efficient mixing, heat transfer and catalytic reaction (of reactants in continuous flow chemical reactors) as described herein.

The static mixer element may be provided in a configuration selected from one or more of the following general non-limiting example configurations:
    open configurations with helices;
    open configurations with blades;
    corrugated-plates;
    multilayer designs;
    closed configurations with channels or holes.

In one embodiment, the scaffold of the static mixer may be provided in a mesh configuration having a plurality of integral units defining a plurality of passages configured for facilitating mixing of the one or more fluidic reactants.

In another embodiment, the static mixer element may comprise a scaffold provided by a lattice of interconnected segments configured to define a plurality of apertures or passages for promoting mixing of fluid flowing through the reactor chamber. The scaffold may also be configured to promote both heat transfer as well as fluid mixing.

In various embodiments, the geometry or configuration may be chosen to enhance one or more characteristics of the static mixer element selected from: the specific surface area, volume displacement ratio, line-of-sight accessibility for cold-spraying, strength and stability for high flow rates, suitability for fabrication using additive manufacturing, and to achieve one or more of: a high degree of chaotic advection, turbulent mixing, catalytic interactions, and heat transfer.

In some embodiments, the scaffold may be configured to enhance chaotic advection or turbulent mixing, for example cross-sectional, transverse (to the net flow) or localised turbulent mixing. The geometry of the scaffold may be configured to change the localised flow direction or to split the flow more than a certain number of times within a given length along a longitudinal axis of the static mixer element, such as more than 200 $m^{-1}$, optionally more than 400 $m^{-1}$, optionally more than 800 $m^{-1}$, optionally more than 1500 $m^{-1}$, optionally more than 2000 $m^{-1}$, optionally more than 2500 $m^{-1}$, optionally more than 3000 $m^{-1}$, optionally more than 5000 $m^{-1}$. The geometry or configuration of the scaffold may comprise more than a certain number of flow splitting structures within a given volume of the static mixer, such as more than 100 $m^{-3}$, optionally more than 1000 $m^{-3}$, optionally more than $1\times10^4$ $m^{-3}$, optionally more than $1\times10^6$ $m^{-3}$, optionally more than $1\times10^9$ $m^{-3}$, optionally more than $1\times10^{10}$ $m^{-3}$.

The geometry or configuration of the scaffold may be substantially tubular or rectilinear. The scaffold may be formed from or comprise a plurality of segments. Some or all of the segments may be straight segments. Some or all of the segments may comprise polygonal prisms such as rectangular prisms, for example. The scaffold may comprise a plurality of planar surfaces. The straight segments may be angled relative to each other. Straight segments may be arranged at a number of different angles relative to a longitudinal axis of the scaffold, such as two, three, four, five or six different angles, for example. The scaffold may comprise a repeated structure. The scaffold may comprise a plurality of similar structures repeated periodically along the longitudinal axis of the scaffold. The geometry or configuration of the scaffold may be consistent along the length of the scaffold. The geometry of the scaffold may vary along the length of the scaffold. The straight segments may be connected by one or more curved segments. The scaffold may comprise one or more helical segments. Each segment may comprise apertures and passages arranged in multiple orientations to the net flow direction. For example, each segment may comprise apertures and passages arranged in at least three, four, five, six, seven, eight, nine, or ten orientations within a segment. For example, each segment may comprise apertures and passages arranged in at least three orientations (e.g. x, y, z plane etc.) within a segment. It will be appreciated that the apertures and passages of each segment can be freely orientated. In other words, the orientation of the apertures and passages are not limited to the 2D plane. Each segment may comprise polygonal prisms, helical segments, helicoid structures, or combinations thereof, providing a plurality of apertures and passages in the surface of the static mixer. The scaffold may generally define a helicoid. The scaffold may comprise a helicoid including a plurality of apertures in a surface of the helicoid.

The dimensions of the static mixer may be varied depending on the application. The static mixer, or reactor comprising the static mixer, may be tubular. The static mixer or reactor tube may, for example, have a diameter (in mm) in the range of 1 to 5000, 2 to 2500, 3 to 1000, 4 to 500, 5 to 150, or 10 to 100. The static mixer or reactor tube may, for example, have a diameter (in mm) of at least about 1, 5, 10, 25, 50, 75, 100, 250, 500, or 1000. The static mixer or reactor tube may, for example, have a diameter (in mm) of less than about 5000, 2500, 1000, 750, 500, 250, 200, 150, 100, 75, or 50. The aspect ratios (L/d) of the static mixer elements, or reactor chambers comprising the static mixer elements, may be provided in a range suitable for industrial scale flow rates for a particular reaction. The aspect ratios may, for example, be in the range of about 1 to 1000, 2 to 750, 3 to 500, 4 to 250, 5 to 100, or 10 to 50. The aspect ratios may, for example, be less than about 1000, 750, 500, 250, 200, 150, 100, 75, 50, 25, 20, 15, 10, 9, 8, 7, 6, 5, 4, 3, or 2. The aspect ratios may, for example, be greater than about 1, 2, 3, 4, 5, 6, 7, 8, 9, 10, 15, 20, 25, 50, 75, or 100. In one example, the aspect ratio (L/d) of each static mixer element can be at least 15. For example, the aspect ratio (L/d) of each static mixer element can be at least 25.

The static mixer element or reactor is generally provided with a high specific surface area (i.e., the ratio between the internal surface area and the volume of the static mixer element and reactor chamber). The specific surface area may be lower than that provided by a packed bed reactor system. The specific surface area ($m^2$ $m^{-3}$) may be in the range of 100 to 40,000, 200 to 30,000, 300 to 20,000, 500 to 15,000, or 12000 to 10,000. The specific surface area ($m^2$ $m^{-3}$) may be at least 100, 200, 300, 400, 500, 750, 1000, 2000, 3000, 4000, 5000, 7500, 10000, 12500, 15000, 17500, or 20000. It will be appreciated that the specific surface areas can be measured by a number of techniques including the BET isotherm techniques.

The static mixer elements may be configured for enhancing properties, such as mixing and heat transfer, for laminar flow rates or turbulent flow rates. It will be appreciated that for Newtonian fluids flowing in a hollow pipe, the correlation of laminar and turbulent flows with Reynolds number (Re) values would typically provide laminar flow rates where Re is <2300, transient where 2300<Re<4000, and generally turbulent where Re is >4000. The static mixer elements may be configured for laminar or turbulent flow rates to provide enhanced properties selected from one or more of mixing, degree of reaction, heat transfer, and pressure drop. It will be appreciated that further enhancing a particular type of chemical reaction will require its own specific considerations.

In one embodiment, the static mixer element may be generally configured for operating at a Re of at least 0.01, 0.1, 1, 5, 50, 100, 150, 200, 250, 300, 350, 400, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500, 10000. The static mixer element may be configured for operating in a generally laminar flow Re range of about 0.1 to 2000, 1 to 1000, 10 to 800, or 20 to 500. The static mixer element may be configured for operating in a generally turbulent flow Re ranges of about 1000 to 15000, 1500 to 10000, 2000 to 8000, or 2500 to 6000.

The volume displacement % of the static mixer relative to a reactor chamber for containing the mixer is in the range of 1 to 40, 2 to 35, 3 to 30, 4 to 25, 5 to 20, or 10 to 15. The volume displacement % of the static mixer relative to a reactor chamber for containing the mixer may be less than 40%, 35%, 30%, 25%, 20%, 15%, 10%, or 5%.

In another embodiment, the volume displacement % of the static mixer relative to a reactor chamber for containing the mixer may be in the range of 20 to 70%, 25 to 70%, 23 to 70%, 25 to 65%, 23 to 50%, 25 to 55%, 20 to 50%, 30 to 60%, 35 to 55%, 40 to 70%, 40% to 60%, 40% to 55%, or 40% to 50%. The volume displacement % of the static mixer relative to a reactor chamber for containing the mixer may be less than 70%, 65%, 60%, 55%, 50%, 45%, 40%, 35%, 30%, 25%, 23%, or 20%. The volume displacement % of the static mixer relative to a reactor chamber for containing the mixer may be at least 20%, 23%, 25%, 30%, 35%, 40%, 40%, 45%, 50%, 55%, 60%, 65%, or 70%. The volume displacement % of the static mixer relative to a reactor chamber for containing the mixer may be a range provided by any two of these upper and/or lower values.

The configurations of the static mixers may be provided to enhance cross-sectional microscopic turbulence. Such turbulence may result from various sources, including the geometry of CSM or the microscopic roughness of the CSM surface resulting from the 3D printing process and/or surface coating. For example, turbulent length scales may be reduced to provide better mixing. The turbulent length scales may, for example, be in the range of microscopic length scales.

The configurations of the static mixers may be provided to enhance heat transfer properties in the reactor, for example a reduced temperature differential at the exit cross-section. The heat transfer of the CSM may, for example, provide a cross-sectional or transverse temperature profile that has a temperature differential of less than about 20° C./mm, 15° C./mm, 10° C./mm, 9° C./mm, 8° C./mm, 7° C./mm, 6° C./mm, 5° C./mm, 4° C./mm, 3° C./mm, 2° C./mm, or 1° C./mm.

The scaffold may be configured such that, in use, the pressure drop (i.e. pressure differential or back pressure) across the static mixers (in Pa/m) is in a range of about 0.1 to 1,000,000 Pa/m (or 1 MPa/m), including at any value or range of any values therebetween. For example, the pressure drop across the static mixer (in Pa/m) may be, less than about 500,000, 250,000, 100,000, 50,000, 10,000, 5,000, 1,000, 750, 500, 250, 100, 75, 50, 25, 20, 15, 10, or 5 Pa/m. The static mixers may be configured to provide a lower pressure drop relative to a specific flow rate. In this regard, the static mixers, reactor, system, and processes, as described herein, may be provided with parameters suitable for industrial application. The above pressure drops may be maintained where the volumetric flow rate is at least 0.1, 0.5, 1, 1.5, 2, 2.5, 3, 3.5, 4, 4.5, 5, 6, 7, 8, 9, 10, 20, 30, 40, 50 ml/min.

Process for Preparing Static Mixer

A process for preparing a catalytic static mixer (CSM) element for a continuous flow chemical reactor chamber may comprise the steps of:

providing a static mixer element comprising a scaffold defining a plurality of passages configured for mixing one or more fluidic reactants during flow and reaction thereof through the mixer; and applying a catalytic coating to the surface of the scaffold to form a catalytic static mixer (CSM) element.

The static mixer element may be provided by additive manufacturing, such as 3D printing. Additive manufacturing of the static mixer and subsequent catalytic coating can provide a static mixer that is configured for efficient mixing, heat transfer and catalytic reaction (of reactants in continuous flow chemical reactors), and in which the static mixer may be physically tested for reliability and performance, and optionally further re-designed and re-configured using additive manufacturing (e.g. 3D printing) technology. Following original design and development using additive manufacturing, the static mixer may be prepared using other manufacturing process, such as casting (e.g. investment casting). The additive manufacturing provides flexibility in preliminary design and testing, and further re-design and re-configuration of the static mixers to facilitate development of more commercially viable and durable static mixers.

The static mixer elements may be made by the additive manufacture (i.e. 3D printing) techniques. For example, an electron beam 3D printer or a laser beam 3D printer may be used. The additive material for the 3D printing may be, for example, titanium alloy based powders (e.g. 45-105 micrometre diameter range) or the cobalt-chrome alloy based powders (e.g. FSX-414) or stainless steel or aluminium-silicon alloy. The powder diameters associated with the laser beam printers are typically lower than those used with electron beam printers.

3D printing is well understood and refers to processes that sequentially deposit material onto a powder bed via fusion facilitated by the heat supplied by a beam, or by extrusion and sintering-based processes. 3D printable models are typically created with a computer aided design (CAD) package. Before printing a 3D model from an STL file, it is typically examined for manifold errors and corrections applied. Once that is done, the .STL file is processed by software called a "slicer," which converts the model into a series of thin layers and produces a G-code file containing instructions tailored to a specific type of 3D printer. The 3D printing process is advantageous for use in preparing the static mixer elements since it eliminates the restrictions to product design imposed by traditional manufacturing routes. Consequently, the design freedom inherited from 3D printing allows a static mixer geometry to be further optimised for performance than it otherwise would have been.

The catalytically active scaffold may be prepared from a catalytic material selected from at least one of a metal, metal alloy, cermet and metal oxide. The process of preparing a static mixer may comprise a step of applying a coating comprising the catalytic material onto at least a substantial portion of the scaffold by cold spray or electrodeposition. For example, the coating may be provided on at least 50% of the surface of the scaffold. In other embodiments, the coating may be provided on at least 60%, 70%, 80%, 90%, 95%, 98, or 99%, of the surface of the scaffold.

Electrodeposition or electro-plating may involve placing the scaffold in a solution containing metal salts, placing a first electrode in the solution spaced from the scaffold, connecting a second electrode to the scaffold, and applying a voltage across the electrodes. A galvanic reaction then takes place and metal ions in the solution aggregate on the surface of the scaffold thereby coating or plating the scaffold. In some embodiments, an electrochemical flow cell may be used to coat the scaffold, with the scaffold acting as an anode, and the cathode being configured to surround the scaffold. Electro-deposition may provide a smooth coating of catalyst material on the scaffold (as shown in FIGS. 9A and 9B), and does not require line-of sight accessibility.

Cold spray coating techniques generally involve accelerating solid particles to supersonic velocities to achieve ballistic impingement on the surface of a substrate such that the particles adhere to and coat the surface forming a deposition layer of material. Various metal powders may be used for cold spraying onto a surface, and there are a number of different types of cold spraying methods and systems including high pressure cold spray, low pressure cold spray, kinetic metallisation, pulsed gas dynamic spraying, and vacuum cold spray, for example. The particles may or may not be preheated, but the temperature of the particles generally remains below the melting point of the particles. The particles may be accelerated to speeds in the range of 300 ms$^{-1}$ to 1400 ms$^{-1}$ and when they impinge on the surface, the particles plastically deform and bond to the surface.

Figure 3:
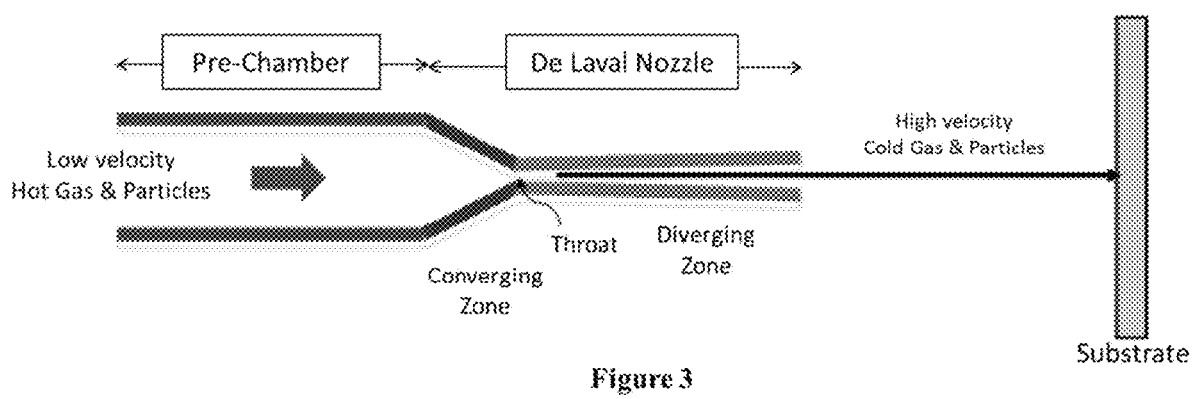
FIG. 3 shows a schematic diagram of a cold spraying system according to some embodiments.

In some embodiments, the particles may be accelerated by feeding them through a converging-diverging nozzle with pressurised gas from a high pressure side of the nozzle to a low pressure side of the nozzle, thereby forming a supersonic gas jet with a stream of supersonic solid particles. In some embodiments, the solid particles may be fed into the gas jet on the low pressure side of the nozzle. The nozzle may be in the form of a de Laval nozzle as shown in FIG. 3. The gas may be heated before being fed through the nozzle.

Cold spray techniques typically result in a dense layer of material forming on the surface of the substrate. However, if the cold spray conditions are carefully controlled a porous coating suitable for catalysis can be formed on a suitable substrate such as a static mixer scaffold. In some embodiments, the catalytic material may be coated onto the surface of the scaffold via a cold spraying process to form a catalytic layer. In some embodiments, the surface of the catalytic layer formed using cold spray deposition may have a high roughness (as shown in FIGS. 8A and 8B) compared with other deposition techniques such as electro-deposition.

The increased roughness may enhance micro-scale turbulent mixing of the fluidic reactants near the surface of the catalytic layer, and may provide a larger surface area of catalytic material on which catalytic reactions can occur. In some applications, it may be preferable to deposit the catalytic material on the scaffold in order to form a more porous catalytic layer, or a catalytic layer with increased roughness compared to that achieved using electro-deposition or other deposition techniques.

Using an existing cold spray system or method may not be suitable for cold spraying some static mixer scaffolds, as the scaffold may be damaged by aerodynamic forces from the impinging gas jet. Therefore, in some embodiments, a system may be put in place to mitigate or avoid damage from the aerodynamic forces.

Figure 6:
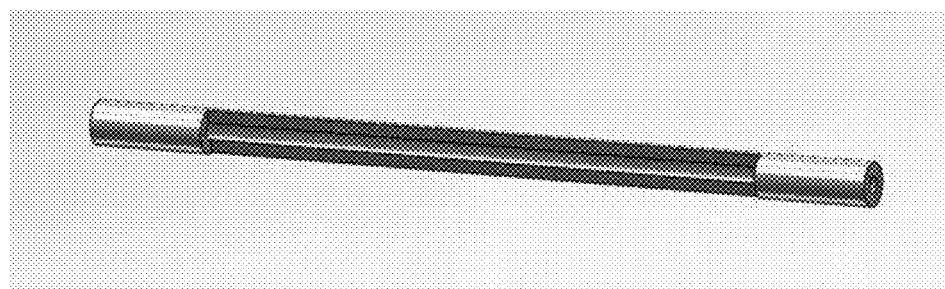
FIG. 6 shows a support member for use with the scaffold support system of FIG. 5.
Figure 10:
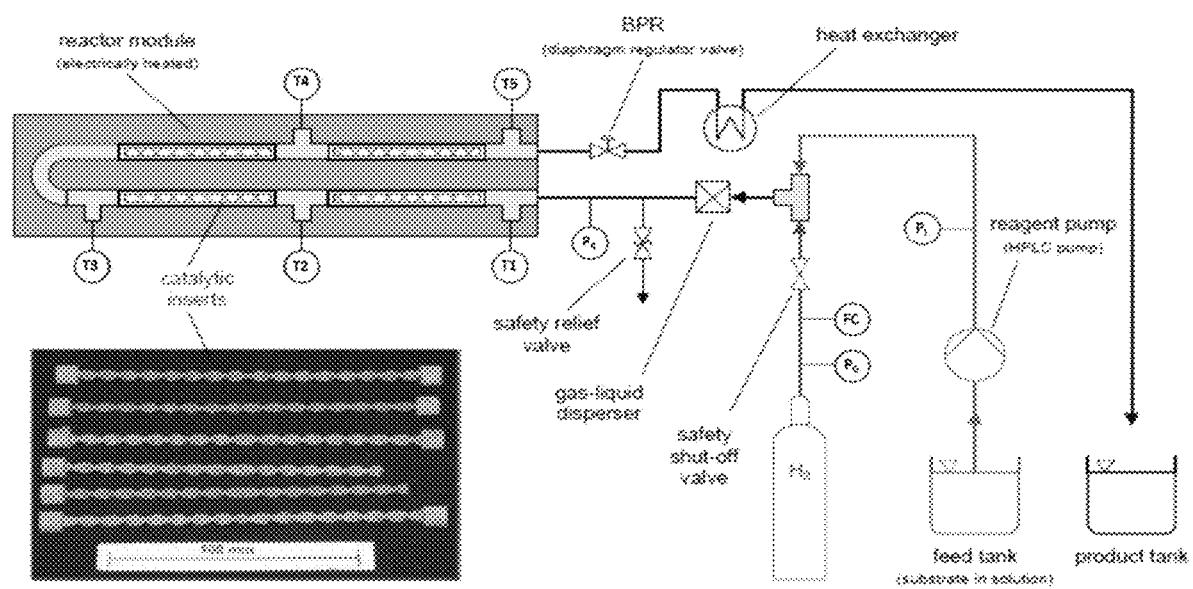
FIG. 10 shows a schematic example of a continuous flow reactor system comprising a CSM of the present disclosure.

Referring to FIG. 6, some embodiments relate to a system for depositing a layer of catalytic material on a scaffold to form a static mixer comprising catalytic material, the system comprising: first and second clamps configured to hold respective ends of the scaffold to maintain the scaffold in a tensioned state; and a cold spraying system configured to accelerate solid particles towards the scaffold to a velocity at which the particles impinge on a surface of the scaffold, plastically deform, and bond to the surface. The first and second clamps may be rotatable relative to the cold spraying system to allow the scaffold to be coated from different relative angles by the cold spraying system. The first and second clamps may be movable relative to the cold spray system in a direction parallel to an axis extending from the first clamp to the second clamp to allow the different parts of the scaffold to be coated by the cold spraying system. One or both of the first and second clamps may be driven to rotate by a motor. One of the first and second clamps may be free to rotate with the scaffold and the other clamp. In some embodiments, one or both of the first and second clamps may comprise or be coupled to a tensioning device to apply tension to the scaffold. Holding the scaffold in tension may reduce or mitigate vibration or bending stresses in the scaffold due to aerodynamic forces produced by the cold spray system as shown in FIG. 10.

Figure 5:
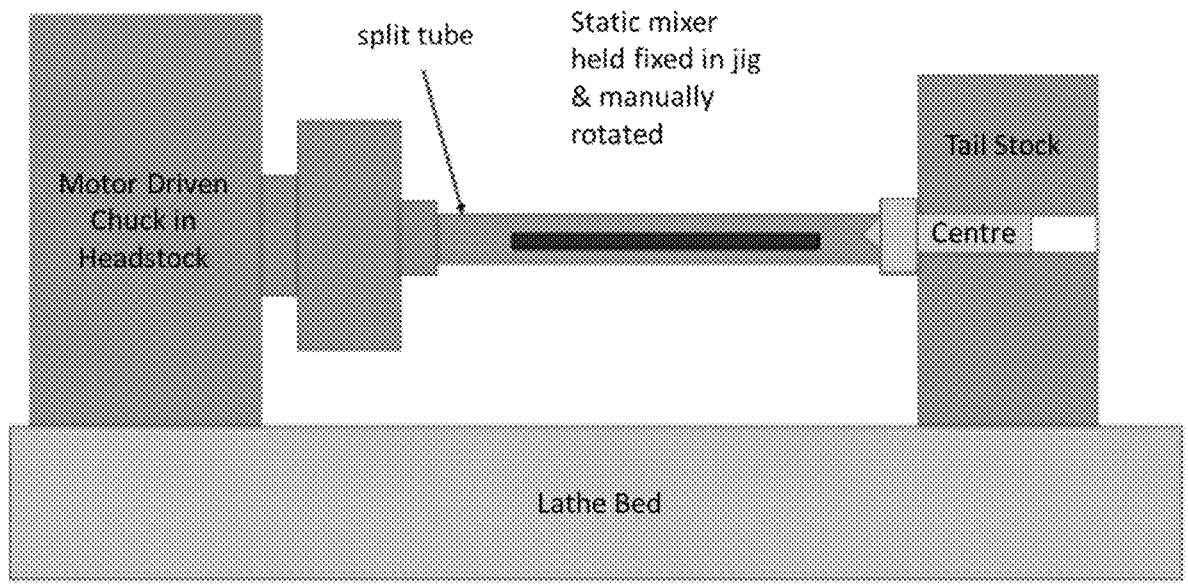
FIG. 5 shows a scaffold support system for cold spraying a scaffold according to other embodiments.

Referring to FIGS. 5 and 6, some embodiments relate to a system for depositing a layer of catalytic material on a scaffold to form a static mixer comprising catalytic material, the system comprising: a cold spraying system configured to accelerate solid particles towards the scaffold to a velocity at which the particles impinge on a surface of the scaffold, plastically deform, and bond to the surface; and a support member configured to support the scaffold against aerodynamic forces produced by the cold spraying system. The support member may extend along a length of the scaffold and be positioned on an opposite side of the scaffold to a nozzle of the cold spraying system. The support member or jig may comprise a slit tube. The support member may comprise a generally cylindrical tube or pipe configured to receive the scaffold and define a window in a side wall of the tube to allow lateral line of sight access to the scaffold for cold spraying the scaffold (as shown in FIG. 6). The scaffold may be rotatable relative to the support member to allow the scaffold to be coated from different relative angles by the cold spraying system. The scaffold may be movable relative to the support member and/or the cold spray system in a direction parallel to a longitudinal axis of the scaffold to allow the different parts of the scaffold to be coated by the cold spraying system. Mounting the scaffold in the support member before cold spraying the scaffold may reduce or mitigate vibration or bending stresses in the scaffold due to aerodynamic forces produced by the cold spray system.

Figure 7A:
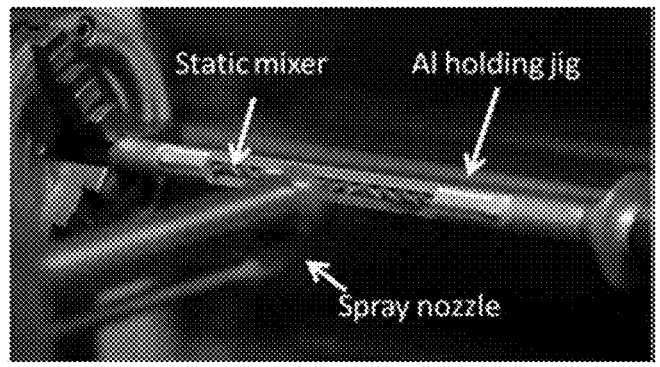
FIG. 7A illustrates a process for coating static mixers according to one example.
Figure 7B:
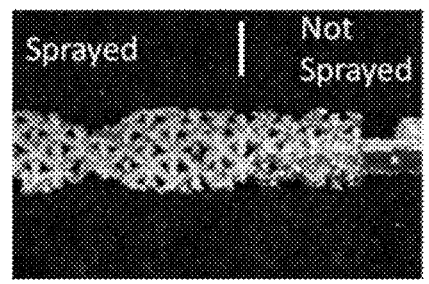
FIG. 7B shows a static mixer coated in accordance with the process of FIG. 6A.

In some embodiments, the scaffold may be held in the chuck of a lathe and the cold spray nozzle may be moved in a direction parallel to the longitudinal axis of the scaffold to make one or more passes along the scaffold to coat different parts of the scaffold as shown in FIG. 7. The support member may be held in the chuck with the scaffold, or the support member may be held in the cuck and the scaffold held in the support member. The scaffold may be rotated between successive rounds of cold spraying to present different aspects of the surface of the scaffold to the cold spray nozzle.

In some embodiments, the support member may be held stationary relative to a body of the lathe, and the scaffold held in the chuck so that the lathe can rotate the scaffold relative to the support member to coat the surface of the scaffold from different angles. In some embodiments, the scaffold may not directly contact the scaffold, or may only contact part of the scaffold, but may none-the-less reduce or mitigate the aerodynamic forces that the scaffold is subjected to during the cold spraying process.

Some embodiments relate to a method for depositing a layer of catalytic material on a scaffold to form a static mixer comprising catalytic material, the method comprising: using a cold spraying system comprising a cold spraying nozzle to accelerate solid particles towards the scaffold to a velocity at which the particles impinge on a surface of the scaffold, plastically deform, and bond to the surface, wherein the scaffold is supported by a support member to reduce or mitigate effects of aerodynamic forces produced by the cold spraying system on the scaffold; moving the cold spraying nozzle in a direction parallel to a longitudinal axis of the scaffold to make one or more cold spraying passes of the scaffold thereby coating different portions of the scaffold along a length of the scaffold; and rotating the scaffold relative to the cold spraying nozzle to coat scaffold from different angular directions.

Some embodiments relate to a method of forming a catalytic static mixer, the method comprising: coating a scaffold with a catalytic material using a cold spraying process. In some embodiments, the method may first comprise forming the scaffold using an additive manufacturing process, such as 3D printing.

Catalyst Material

Catalytically reactive sites of the scaffold may be provided by at least one of the following: the scaffold being formed from a catalytic material; a catalyst material being intercalated, interspersed and/or embedded with at least part of the scaffold; and at least a part of the surface of the scaffold comprising a coating comprising a catalyst material. In one embodiment, the catalytically reactive sites are provided by a coating comprising a catalyst material on the scaffold.

It will be appreciated that the catalyst material may be selected and varied based on a particular reaction or application required. The catalyst material may be selected to provide for heterogeneous catalysis reactions in a continuous flow reactor environment. A wide range of heterogeneous catalysis chemical reactions may be provided for by selection from a wide range of catalytic materials, including but not limited to the following: hydrogenations using hydrogen gas, transfer hydrogenations using a liquid hydrogen donor, catalytic oxidations, reductive aminations, carbon-carbon couplings including Suzuki, Sonogashira, Heck, Stille, Negishi, Ullmann, Kumada couplings and other metal catalysed organic transformations.

Hydrogenation Reactions

The hydrogenations using hydrogen gas or transfer hydrogenations using a liquid hydrogen donor may be for hydrogenating compounds containing one or more functional groups selected from one or more of alkenes, alkynes, aldehydes, carbonyls, ketones, carboxylic acids, ethers, esters, halides, imines, amides, nitrogen, nitriles and nitro groups.

In an embodiment, the functional groups selected from one or more of alkenes, alkynes, aldehydes, carbonyls, ketones, carboxylic acids, ethers, esters, halides, imines, amides, nitrogen, nitriles and nitro groups may be hydrogenated as follows: alkenes to alkanes, alkynes to alkenes and/or alkanes, aldehydes to alcohols, carbonyls to alcohols, ketones to alcohols, carboxylic acids to alcohols, ethers to alcohols, esters to alcohols, halides to hydrogen, imines to amines, amides to amines and alcohols, nitrogen to ammonia, nitriles to amines, and nitro groups to hydrogen, amine and/or analines.

In an embodiment, the hydrogenation may be for hydrogenating compounds containing one or more alkene functional groups. For example, compounds containing one or more alkene functional group include compounds preferably comprising from one to about 20 carbon atoms and one or more alkene group, and may include monoolefins and diolefins. Typical monoolefins include, but are not limited to, ethylene, propylene, 1-butene, 2-butene, isobutylene, 1-pentene, 2-pentene, methyl-1-butenes (such as 2-methyl-1-butene), methyl-2-butenes (such as 2-methyl-2-butene), 1-hexene, 2-hexene, 3-hexene, methyl-1-pentenes, 2,3-dimethyl-1-butene, 1-heptene, 2-heptene, 3-heptene, methyl-1-hexenes, methyl-2-hexenes, methyl-3-hexenes, dimethylpentenes, ethylpentenes, octenes, methylheptenes, dimethylhexenes, ethylhexenes, nonenes, methyloctenes, dimethylheptenes, ethylheptenes, trimethylhexenes, cyclopentene, cyclohexene, methylcyclopentene, cycloheptene, methylcyclohexene, dimethylcyclopentenes, ethylcyclopentenes, cyclooctenes, methylcycloheptenes, dimethylcyclohexenes, ethylcyclohexenes, trimethylcyclo-hexenes, methylcyclooctenes, dimethylcyclooctenes, ethylcyclooctenes, and combinations and isomers thereof. The monoolefin compounds may be hydrogenated to their corresponding alkane compound containing the same number of carbons atoms per molecule as the monoolefin compound.

Typical diolefins include, but are not limited to, propadiene, 1,2-butadiene, 1,3-butadiene, isoprene, 1,2-pentadiene, 1,3-pentadiene, 1,4-pentadiene, 1,2-hexadiene, 1,3-hexadiene, 1,4-hexadiene, 1,5-hexadiene, 2-methyl-1,2-pentadiene, 2,3-dimethyl-1,3-butadiene, heptadienes, methylhexadienes, octadienes, methylheptadienes, dimethylhexadienes, ethylhexadienes, trimethylpentadienes, methyloctadienes, dimethylheptadienes, ethyloctadienes, trimethylhexadienes, nonadienes, decadienes, undecadienes, dodecadienes, cyclopentadienes, cyclohexadienes, methylcyclo-pentadienes, cycloheptadienes, methylcyclohexadienes, dimethylcyclopentadienes, ethylcyclopentadienes, dicyclopentadiene and combinations and isomers thereof. The diolefin compounds may be hydrogenated to the corresponding monoolefins containing the same number of carbon atoms per molecule as the diolefin molecule. For example, propadiene is hydrogenated to propylene; 1,2-butadiene and 1,3-butadiene are hydrogenated to 1-butene and 2-butene; 1,3-pentadiene and 1,4-pentadiene are hydrogenated to 1-pentene and 2-pentene; isoprene is hydrogenated to methyl-1-pentenes and methyl-2-pentenes; and 1,3-cyclopentadiene is hydrogenated to cyclopentene. Alternatively, the diolefin compounds may be hydrogenated further to the corresponding alkane compound containing the same number of carbon atoms per molecule as the diolefin compound. For example, propadiene is hydrogenated to propane; 1,2-butadiene and 1,3-butadiene are hydrogenated to butane; 1,3-pentadiene and 1,4-pentadiene are hydrogenated to pentane.

The alkene containing compounds may also contain other functional groups selected from one or more of, alkynes, aldehydes, carbonyls, ketones, carboxylic acids, ethers, esters, halides, imines, amides, nitrogen, nitriles and nitro groups. Typical compounds include, but are not limited to, vinyl acetate, oleic acid, or cinnamaldehyde.

In an embodiment, the hydrogenation may be for hydrogenating compounds containing one or more alkyne functional group. For example, compounds containing one or more alkyne functional group include compounds preferably comprising from 1 to about 20 carbon atoms and one or more alkyne group. Typical alkynes include, but are not limited to, acetylene, propyne (also referred to as methylacetylene), 1-butyne, 2-butyne, 1-pentyne, 2-pentyne, 3-methyl-1-butyne, 1-hexyne, 1-heptyne, 1-octyne, 1-nonyne, 1-decyne and combinations and isomers thereof. The alkynes may be hydrogenated to the corresponding alkenes. For example, acetylene is hydrogenated to ethylene; propyne is hydrogenated to propylene; and the butynes are hydrogenated to the corresponding butenes (e.g., 1-butene, 2-butenes). Alternatively, the alkyne compounds may be hydrogenated to the corresponding alkane compound containing the same number of carbon atoms per molecule as the alkyne molecule. For example, acetylene is hydrogenated to ethane, propyne is hydrogenated to propane, and the butynes are hydrogenated to butane. The alkyne containing compounds may also contain other functional groups selected from one or more of, alkenes, aldehydes, carbonyls, ketones, carboxylic acids, ethers, esters, halides, imines, amides, nitrogen, nitriles and nitro groups. Typical compounds include, but are not limited to, vinyl acetate, oleic acid, or cinnamaldehyde.

In an embodiment, the hydrogenation may be for hydrogenating compounds containing one or more aldehyde functional groups. For example, compounds containing one or more aldehyde functional groups include compounds preferably comprising from 1 to about 20 carbon atoms and one or more aldehyde groups. Typical aldehydes include, but are not limited to, formaldehyde, acetaldehyde, propionaldehyde, n- and iso-butyraldehydes, n- and iso-valeraldehyde, n-hexaldehyde, n-heptaldehyde, n-octanal, 2-ethylhexanal, 2-ethylhex-2-enal (2-ethyl propyl acrolein), n-decanal, 2-ethylbutanal, propargyl aldehyde, acrolein, glyoxal, crotonaldehyde, furfural, aldol, hexahydrobenzaldehyde, alpha-citronellal, citral, chloral, trimethylacetaldehyde, diethylacetaldehyde, tetrahydrofurfural, phenylacetaldehyde, cinnamaldehyde, hydrocinnamaldehyde, as well as combinations and isomers thereof.

The aldehyde compounds may be hydrogenated to the corresponding alcohol compound containing the same number of carbon atoms per molecule as the aldehyde molecule. For example, formaldehyde is hydrogenated to methanol, acetaldehyde is hydrogenated to ethanol, propionaldehyde is hydrogenated to propanol. The aldehyde containing compounds may also contain other functional groups selected from one or more of, alkenes, alkynes, carbonyls, ketones, carboxylic acids, ethers, esters, halides, imines, amides, nitrogen, nitriles and nitro groups. Typical compounds include, but are not limited to, vinyl acetate, oleic acid, or cinnamaldehyde.

In an embodiment, the hydrogenation may be for hydrogenating compounds containing one or more carbonyl functional groups. For example, compounds containing one or more carbonyl functional groups include compounds preferably comprising from 1 to about 20 carbon atoms and 1 or more carbonyl groups. Typical compounds containing carbonyl functional groups may also characterise other compounds containing other types of functional groups including aldehydes, carbonyls, ketones, carboxylic acids, esters, amides, enones and imide groups. The compounds containing carbonyl functional groups may be hydrogenated to the corresponding alcohol compound containing the same number of carbon atoms per molecule. The carbonyl containing compounds may also contain other functional groups selected from one or more of, alkenes, alkynes, aldehydes, ketones, carboxylic acids, ethers, esters, halides, imines, amides, nitrogen, nitriles and nitro groups. Typical compounds include, but are not limited to, vinyl acetate, oleic acid, or cinnamaldehyde.

In an embodiment, the hydrogenation may be for hydrogenating compounds containing one or more carboxylic acid functional groups. For example, compounds containing one or more carboxylic acrid functional groups include compounds preferably comprising from 1 to about 20 carbon atoms and 1 or more carbonyl groups. Typical carboxylic acid containing compounds include, but are not limited to, acetic acid, oxalic acid, propanoic acid, butanoic acid, pentanoic acid, hexanoic acid heptanoic acid, octanoic acid, nonanoic acid, decanoic acid, undecoanoic acid, dodecanoic acid, tridecanoic acid, tetradecanoic acid, pentadecanoic acid, hexadecanoic acid, heptadecanoic acid, octadecanoic acid, nonadecanoic acid, and eicosanoic acid, and isomers thereof. The compounds containing carboxylic acid functional groups may be hydrogenated to the corresponding alcohol compound containing the same number of carbon atoms per molecule. The carboxylic acid containing compounds may also contain other functional groups selected from one or more of alkenes, alkynes, aldehydes, carbonyls, ketones, ethers, esters, halides, imines, amides, nitrogen, nitriles and nitro groups. Typical compounds include, but are not limited to, vinyl acetate, oleic acid, or cinnamaldehyde.

In an embodiment, the hydrogenation may be for hydrogenating compounds containing one or more ether functional groups. For example, compounds containing one or more ether functional groups include compounds preferably comprising from 1 to about 20 carbon atoms and 1 or more ether groups. Typical ethers include, but are not limited to, diethyl ether, di-tert-butyl ether, glycol ethers, tetrahydrofuran, diisopropyl ether, dimethoxyethane. The compounds containing ether functional groups may be hydrogenated to both an alcohol containing compound. The ether containing compounds may also contain other functional groups selected from one or more of alkenes, alkynes, aldehydes, carbonyls, carboxylic acids, ketones, esters, halides, imines, amides, nitrogen, nitriles and nitro groups.

In an embodiment, the hydrogenation may be for hydrogenating compounds containing one or more ester functional groups. For example, compounds containing one or more ester functional groups include compounds preferably comprising from 1 to about 20 carbon atoms and 1 or more ester groups. The ester containing compounds may also contain other functional groups selected from one or more of alkenes, alkynes, aldehydes, carbonyls, carboxylic acids, ketones, ethers, halides, imines, amides, nitrogen, nitriles and nitro groups.

In an embodiment, the hydrogenation may be for hydrogenating compounds containing one or more imine functional groups. For example, compounds containing one or more imine functional groups include compounds preferably comprising from 1 to about 20 carbon atoms and 1 or more imine groups. The imine containing compounds may also contain other functional groups selected from one or more of alkenes, alkynes, aldehydes, carbonyls, carboxylic acids, ketones, ether, esters, halides, amides, nitrogen, nitriles and nitro groups.

In an embodiment, the hydrogenation may be for hydrogenating compounds containing one or more amide functional groups. For example, compounds containing one or more amide functional groups include compounds preferably comprising from 1 to about 20 carbon atoms and 1 or more amide groups. The amide containing compounds may also contain other functional groups selected from one or more of alkenes, alkynes, aldehydes, carbonyls, carboxylic acids, ketones, ethers, esters, halides, imines, nitrogen, nitriles and nitro groups.

In an embodiment, the hydrogenation may be for hydrogenating compounds containing one or more nitrogen functional groups. For example, compounds containing one or more nitrogen functional groups include compounds preferably comprising from 1 to about 20 carbon atoms and 1 or more nitrogen groups. The nitrogen containing compounds may also contain other functional groups selected from one or more of alkenes, alkynes, aldehydes, carbonyls, carboxylic acids, ketones, ethers, esters, halides, imines, amides, nitriles and nitro groups.

In an embodiment, the hydrogenation may be for hydrogenating compounds containing one or more nitrile functional groups. For example, compounds containing one or more nitrile functional groups include compounds preferably comprising from 1 to about 20 carbon atoms and 1 or more nitrile groups. The nitrile containing compounds may also contain other functional groups selected from one or more of alkenes, alkynes, aldehydes, carbonyls, carboxylic acids, ketones, ethers, esters, halides, imines, amides, nitrogen, and nitro groups.

In an embodiment, the hydrogenation may be for hydrogenating compounds containing one or more nitro functional groups. For example, compounds containing one or more nitro functional groups include compounds preferably comprising from 1 to about 20 carbon atoms and 1 or more nitro groups. The nitro containing compounds may also contain other functional groups selected from one or more of alkenes, alkynes, aldehydes, carbonyls, carboxylic acids, ketones, ethers, esters, halides, imines, amides, nitrogen, and nitriles.

In an embodiment, the hydrogenation may be for hydrogenating compounds containing one or more halide functional groups. Such hydrogenation is also known has halide reduction. For example, compounds containing one or more halide functional groups include compounds preferably comprising from 1 to about 20 carbon atoms and 1 or more halide groups. The halide functional groups in the compounds containing one or more halide functional groups are selected from the group consisting of fluoride ($F^-$), chloride ($Cl^-$), bromide ($Br^-$), iodide ($I^-$) and astatide ($At^-$). The halide containing compounds may also contain other functional groups selected from one or more of alkenes, alkynes, aldehydes, carbonyls, carboxylic acids, ketones, ethers, esters, imines, amides, nitrogen, nitriles and nitro groups. For example, typical compounds containing one or more halide functional groups include, but are not limited to, organohalides (e.g. acid halides).

In an embodiment, the hydrogenation may also be for hydrogenating compounds to remove various protecting groups comprising any one or more of the above mentioned functional groups, such as protected ethers (e.g. benzyl or silyl protected ethers, see Green et al, Protective Groups in Organic Synthesis, Wiley-Interscience, New York, 1999).

The temperature (° C.) for the hydrogenation of compounds containing one or more functional groups selected from one or more of alkenes, alkynes, aldehydes, carbonyls, ketones, carboxylic acids, ethers, esters, imines, amides, nitrogen, nitriles and nitro groups may be in the range of about 10 to 200, 20 to 195, 40 to 190, 60 to 185, 80 to 180, 100 to 175, 120 to 170, 140 to 165. For example, the temperature (° C.) may be at least about 20, 40, 60, 80, 100, 120, 140, 160, 180, or 200. For example, the temperature (° C.) may be less than about 200, 190, 180, 170, 160, 150, 140, 100 or 50. The temperature may also be provided at about any of these values or in a range between any of these values, such as a range between about 20 to 200° C., about 50 to 180° C., or about 100 to 150° C.

The pressure (bar) for the hydrogenation of compounds containing on ore more function groups selected from one or more of alkenes, alkynes, aldehydes, carbonyls, ketones, carboxylic acids, ethers, esters, halides, imines, amides, nitrogen, nitriles and nitro groups may be in the range of about 1 to 50, 5 to 40, 10 to 30 or 15 to 20. For example, the pressure (bar) may be at least about 1, 5, 10, 15, 20, 25, 30, 35, 40, 45 or 50. For example, the pressure (bar) may be less than about 50, 40, 30, 20, 15, 10 or 5. For example, the pressure (bar) may be about 16. The pressure (bar) may also be provided at about any of these values or in a range between any of these values, such as a range between about 5 to 50 or about 10 to 25.

The scaffold of the static mixer may comprise or consist of at least one of a metal, metal alloy, cermet and metal oxide. The scaffold may be a metal scaffold, for example formed from metals or metal alloys. The scaffold may be formed from a metal or metal alloy capable of catalytic reactions, such as palladium. The metal scaffold may be prepared from a material suitable for additive manufacturing (i.e. 3D printing). The metal scaffold may be prepared from a material suitable for further surface modification to provide or enhance catalytic reactivity, for example a metal including nickel, titanium, palladium, platinum, gold, copper, aluminium or their alloys and others, including metal alloys such as stainless steel. In one embodiment the metal for the scaffold may comprise or consist of titanium, stainless steel, and an alloy of cobalt and chromium. In another embodiment, the metal for the scaffold may comprise or consist of stainless steel and cobalt chromium alloy. Using additive manufacturing techniques, i.e. 3D metal printing, the metal scaffold can be specifically designed to perform two major tasks: a) to act as a catalytic layer or a substrate for a catalytic layer, b) to act as a flow guide for optimal mixing performance during the chemical reaction and subsequently assist transfer of exothermic heat to the walls of the reactor tube (single phase liquid stream or multiphase stream) inside the reactor.

The scaffold or catalytic material may comprise or consist of a metal selected from at least one of iron, aluminium, cobalt, copper, zinc, nickel, palladium, platinum, gold, silver, ruthenium, iridium, rhodium, titanium vanadium, zirconium, niobium, tantalum, and chromium, or a metal alloy, cermet or metal oxide thereof. The scaffold or catalytic material may comprise or consist of titanium, aluminium, nickel, iron, silver, cobalt, chromium, or an alloy thereof. The scaffold may comprise or consist of titanium, titanium alloy or stainless steel. The titanium alloy may comprise aluminium and vanadium, for example. Non-limiting examples of other transition metals that may be used in metal alloys are zirconium, niobium and tantalum.

In an embodiment, the scaffold or catalytic material comprises at least one of a metal, semi-metal and metal oxide. For example, the scaffold or catalytic material may comprise one or more of the following:
  a metal selected from iron, cobalt, chromium, aluminium, vanadium, copper, zinc, nickel, palladium, platinum, gold, silver, ruthenium, iridium, and rhodium, or alloys or mixtures thereof;
  a semimetal selected from Bi, CdTe, HgCdTe, GaAs, or mixtures thereof; and
  a metal oxide selected from PbO, $PbO_2$, ZnO, $TiO_2$, CoO, $Al_2O_3$, or mixtures thereof.

The surface of the scaffold may be modified to provide or enhance catalytic reactivity, such as by roughening, and/or depositing a metal or alloy on at least a part of the surface of the scaffold, such as a further deposited (sputtered) layer. Surface roughening may be achieved by any process of acid treatment, heat treatment in controlled gas atmospheres, physical vapour deposition, cold spray, plasma spray, ion implantation flame spray pyrolysis electrodeposition, chemical vapour deposition, glow discharge, sputtering, and plating or by any mechanical means. The surface modification may provide one or more outer layers, for example one or more metal deposited (e.g. sputtered) layers.

A catalytic material may refer to a catalyst by itself or to a material or composition comprising a catalyst. The catalytic material may be provided in a composition with one or more additives, such as binders, to facilitate coating of the catalyst to the scaffold. The catalyst or coating thereof may be provided as a partial coating or a complete layer on the scaffold. The coating or layer of the catalyst on the scaffold may be provided in one or more layers. The catalyst may be deposited on the scaffold by brush coating, painting, slurry spraying, spray pyrolysis, sputtering, chemical or physical vapour deposition techniques, electroplating, screen printing, tape casting, electro-deposition, flame spraying, arc spraying, plasma spraying, detonation spraying, high velocity oxy-fuel flame spraying, laser spraying, or cold spraying. A catalytic material or coating of the scaffold may be provided by a metal deposition process, for example an electrodeposition or cold spray coating. Electroplating and cold spray coating techniques have been surprisingly shown to provide further advantages for the catalytic static mixers. The electroplating and cold spray techniques can provide a single step process in forming a porous catalytic coating. Standard catalyst coating techniques have typically involved a two-step process of first forming a porous metal oxide layer and then secondly impregnating the catalyst into the pre-formed porous layer. In an embodiment, the catalytic material or coating on the scaffold does not comprise a metal oxide porous layer as a support for impregnated catalytic material.

It will be appreciated that the catalytic material, or composition or coating thereof, may include one or more additives. The additives may include catalysts or promoters to enhance reaction rates at the scaffold or static mixer surface. The one or more additives may be incorporated within the scaffold itself (such as by doping), for example by addition to additive manufacturing material. Promoters may include materials with a low electronegativity. Suitable promoters may be selected from alkali metals (K, Cs) and alkali earths (mostly Ba). It will be appreciated that exceptions may include the rare earths (La, Ce and Sm) that have a moderately high electronegativity.

The catalyst material may include a dissociation catalyst, which may be chosen from the group consisting of molybdenum, tungsten, iron, ruthenium, cobalt, boron, chromium, tantalum, nickel, and alloys, compounds and mixtures thereof.

In one embodiment, the scaffold is a metal scaffold comprising a coating comprising catalytic material. In another embodiment, the metal scaffold comprises titanium, nickel, aluminium, stainless steel, cobalt, chromium, any alloy thereof, or any combination thereof. In another embodiment, the metal scaffold comprises at least one of a stainless steel and aluminium. In another embodiment, the metal scaffold comprises titanium, or a titanium alloy. In a further embodiment, the catalytic material comprises nickel. Further advantages may be provided wherein the metal scaffold comprises or consists of stainless steel or a cobalt chromium alloy.

In one embodiment, the catalytically active scaffold is a stainless steel scaffold or a cobalt chromium alloy scaffold, and the surface of the scaffold is provided with an electrodeposition or cold spray coating comprising a metal selected from platinum or nickel.

The weight % of the coating or catalyst material, based on total weight of catalytic static mixer, may be in the range of 1 to 40%, 2 to 35%, 5 to 30%, 10 to 25%, or 15 to 20%. The weight % of the coating comprising the catalyst material, based on total weight of catalytic static mixer, may be at least 1%, 5%, 10%, 15%, 20%, 35%, 30%, 35%, or 40%. The weight % of the coating comprising the catalyst material, based on total weight of catalytic static mixer, may be less than 50%, 40%, 30%, 20%, 15%, 10%, 5%, or 3%.

Continuous Flow Systems and Reactors

The present disclosure provides a continuous flow chemical reactor for use in catalytic reactions of one or more fluidic reactants. The reactor may comprise one or more chamber sections in fluid communication with each other. It will be appreciated that at least one chamber section comprises a static mixer element. The chamber sections may be referred to as chamber modules, wherein each module may contain one or more static mixer elements. The static mixer element can be configured for inserting into a continuous flow chemical reactor, which may be referred to as a "static mixer insert". The static mixer elements or inserts may also be provided in the form of one or more modules. It will be appreciated that the static mixer is an integral part of the chemical reactor. The static mixer and chamber section together form the reactor chamber, which may be provided as a single unit. The chamber section may provide the housing for the static mixer. The chamber section may optionally include a heat exchanger system, which may be used for controlling heat removed from the reactor chamber during its operation. The chamber section may include a one or more static mixer elements, one or more catalytic static mixer elements, one or more heat exchanger systems, etc., and combinations thereof. The one or more static mixer elements or chamber sections may be configured for use in series or parallel operation. It will be appreciated that the static mixer, or reactor thereof, may comprise one or more reactant inlets for supply of one or more fluidic reactants to a chamber section, and one or more outlets in fluid communication with the static mixer for receiving an output stream comprising a product or products of the reaction.

In one embodiment, the continuous flow chemical reactor is a tubular or plug flow reactor.

In another embodiment, the reactor comprises a heat exchanger for controlling the temperature of the reactor, chamber section, catalytic static mixer, or fluidic components thereof. The heat exchanger may be a shell and tube heat exchanger design or configuration.

In an embodiment, the aspect ratios of the reactor may, for example, be similar to those previously described for the static mixer such that a static mixer element may be configured for insertion into the reactor. In one example, the aspect ratio (L/d) of the reactor can be at least about 50. In another example, the aspect ratio (L/d) of the reactor can be at least about 75. For example, the aspect ratio (L/d) of each static mixer element can be at least 15, and arranged in each reaction chamber section in a series of one or more static mixer elements to a total aspect ratio (L/d) of at least 50. In another example, the aspect ratio (L/d) of each static mixer element can be at least 25, and arranged in each reaction chamber section in a series of one or more static mixer elements to a total aspect ratio (L/d) of at least 75.

The present disclosure also provides a system for a continuous flow chemical reaction process comprising:
  a continuous flow chemical reactor comprising one or more static mixers according to any of the embodiments described herein;
  a pump for providing fluidic flow for one or more fluidic reactants and any products thereof through the reactor,
  optionally one or more heat exchangers for controlling the temperature of the reactor, chamber section, catalytic static mixer, or fluidic components thereof; and
  a control means for controlling one or more of the parameters of the system selected from concentration, flow rate, temperature, pressure, and residence time, of the one or more fluidic reactants, sources of fluidic reactants, carrier fluids, or products of the reaction.

The system may further comprise a dispersing unit, which can be configured before and/or after the chamber section. The dispersing unit may comprise a static mixer for dispersing the one or more fluidic reactants.

The system may further comprise a spectrometer, which can be used for identifying and determining concentrations for any one or more fluidic reactants or products thereof.

One or more of the reactor, reactor chamber, chamber section and static mixer, may each be provided in modular form for complimentary association thereof. The system may comprise a plurality of reactors, which may be of similar or different internal and/or external configuration. The reactors may operate in series or in parallel. It will be appreciated that the system, reactor, or each chamber section, may include one or more inlets and outlets to provide supply of reactants, obtain products, or to recirculate various reactants and/or products.

It will also be appreciated that the reactor or system may be designed for recycling of the various reactants, reactant sources, intermediary products, or desired products provided to and produced in the chamber sections. The reactor or system may be provided in various designs and forms, for example in the form of a tubular reactor. In another embodiment, the reactor is a single pass reactor.

The system and processes may also be integrated into more complex systems, such as systems and processes comprising a coal gasifier, electrolyser and/or natural gas reformer etc.

Catalytic Processes and Reactions

The static mixer is for use in a continuous flow chemical reaction system and process. The process may be an in-line continuous flow process. The in-line continuous flow process may be a recycle loop or a single pass process. In one embodiment, the in-line continuous flow process is a single pass process.

As mentioned above, the chemical reactor comprising the static mixer element is capable of performing heterogeneous catalysis reactions in a continuous fashion. The chemical reactor may use single or multi-phase feed and product streams. In one embodiment, the substrate feed (comprising one or more reactants) may be provided as a continuous fluidic stream, for example a liquid stream containing either: a) the substrate as a solute within an appropriate solvent, or b) a liquid substrate, with or without a co-solvent. It will be appreciated that the fluidic stream may be provided by one or more gaseous streams, for example a hydrogen gas or source thereof. The substrate feed is pumped into the reactor using pressure driven flow, e.g. by means of a piston pump.

The present disclosure also provides a process for synthesizing a product by catalytic reaction of one or more fluidic reactants, the process comprising the steps of:
  providing a continuous flow chemical reactor comprising a static mixer element or system according to any of the embodiments described herein;
  providing at least a first fluidic reactant to the reactor via the one or more reactant inlets;
  operating the chemical reactor, or control means thereof, to provide flow and catalytic reaction of the at least first fluidic reactant through the catalytic static mixer; and
  obtaining an output stream comprising a product of a catalytic reaction of the at least first reactant.

The process may be for synthesizing a product by heterogeneous catalytic reaction of at least a first fluidic reactant with a second fluidic reactant, which may comprise:
  providing a continuous flow chemical reactor comprising a static mixer element or system according to any of the embodiments described herein;
  providing at least a first and second fluidic reactants, or source thereof, to the reactor via the one or more reactant inlets;
  operating the chemical reactor, or control means thereof, to provide flow and catalytic reaction of the first and second fluidic reactant through the static mixer; and
  obtaining an output stream comprising a product of a catalytic reaction of at least the first and second fluidic reactants.

It will be appreciated that various parameters and conditions used in the process, such as temperatures, pressures and concentration/amounts of materials and reactants, may be selected depending on a range of variables of the process including the product to be synthesised, chemical reaction or mechanisms involved, reactant source, selection of catalyst (s) used, or type of reactor being used and materials and configuration thereof. For example, differences will exist where the one or more fluidic reactants, or co-solvents (e.g. inert carriers) etc., are gases, liquids, solids, or combinations thereof. For example, one or more fluidic reactants may be provided in a fluidic carrier, such as a solute reactant in liquid carrier or particularised reactant in a carrier gas. The one or more fluidic reactants may be provided as a gas, for example a gas comprising molecular hydrogen or a source of hydrogen.

Temperatures (° C.) in relation to the process may be in a range between −50 and 400, or at any integer or range of any integers there between. For example, the temperature (° C.) may be at least about −50, −25, 0, 25, 50, 75, 100, 150, 200, 250, 300, or 350. For example, the temperature (° C.) may be less than about 350, 300, 250, 200, 150, 100, or 50. The temperature may also be provided at about any of these values or in a range between any of these values, such as a range between about 0 to 250° C., about 25 to 200° C., or about 50 to 150° C.

As previously mentioned with respect to the static mixer element, the process may involve operation at a Re of at least about 0.01, 0.1, 1, 5, 50, 100, 150, 200, 250, 300, 350, 400, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, 8000, 8500, 9000, 9500, or 10000. The process may involve operation at a Re range provided by any two of the previously recited values. The process may involve operation at a generally laminar flow, for example a Re range of about 50 to 2000, 100 to 1500, 150 to 1000, or 200 to 800. The process may involve operation at a generally turbulent flow, for example at a Re range of about 3000 to 15000, 4000 to 10000, or 5000 to 9000.

The volume displacement % of the static mixer relative to a reactor chamber for containing the mixer is in the range of 1 to 40, 2 to 35, 3 to 30, 4 to 25, 5 to 20, or 10 to 15. The volume displacement % of the static mixer relative to a reactor chamber for containing the mixer may be less than 40%, 35%, 30%, 25%, 20%, 15%, 10%, or 5%.

In another embodiment, the volume displacement % of the static mixer relative to a reactor chamber for containing the mixer may be in the range of 20 to 70%, 25 to 70%, 23 to 70%, 25 to 65%, 23 to 50%, 25 to 55%, 20 to 50%, 30 to 60%, 35 to 55%, 40 to 70%, 40% to 60%, 40% to 55%, or 40% to 50%. The volume displacement % of the static mixer relative to a reactor chamber for containing the mixer may be less than 70%, 65%, 60%, 55%, 50%, 45%, 40%, 35%, 30%, 25%, 23%, or 20%. The volume displacement % of the static mixer relative to a reactor chamber for containing the mixer may be at least 20%, 23%, 25%, 30%, 35%, 40%, 40%, 45%, 50%, 55%, 60%, 65%, or 70%. The volume displacement % of the static mixer relative to a reactor chamber for containing the mixer may be a range provided by any two of these upper and/or lower values.

Further advantages of the static mixers, at least according to some embodiments as disclosed herein, is provided by an increase in the volume displacement % of the static mixer element relative to a reaction chamber section for housing the static mixer element to a value of greater than 20%, e.g. greater than 23%, may provide a static mixer with enhanced performance in terms of a) total catalytic loading, and/or b) mixing performance.

The configurations of the static mixers may be provided to enhance cross-sectional microscopic turbulence. Such turbulence may result from various sources, including the geometry of CSM or the microscopic roughness of the CSM surface resulting from the 3D printing process. For example, turbulent length scales may be reduced to provide better mixing. The turbulent length scales may, for example, be in the microscopic length scales.

The configurations of the static mixers may be provided to enhance heat transfer properties in the reactor, for example a reduced temperature differential at the exit cross-section. The heat transfer of the CSM may, for example, provide a cross-sectional or transverse temperature profile that has a temperature differential of less than about 20° C./mm, 15° C./mm, 10° C./mm, 9° C./mm, 8° C./mm, 7° C./mm, 6° C./mm, 5° C./mm, 4° C./mm; 3° C./mm, 2° C./mm, or 1° C./mm.

The scaffold may be configured such that, in use, the pressure drop (or back pressure) across the static mixers (in Pa/m) is in a range of about 0.1 to 1,000,000 Pa/m (or 1 MPa/m), including at any value or range of any values therebetween. For example, the pressure drop (or back pressure) across the static mixer (in Pa/m) may be less than about 500,000, 250,000, 100,000, 50,000, 10,000, 5,000, 1,000, 750, 500, 250, 100, 75, 50, 25, 20, 15, 10, or 5 Pa/m. The static mixers may be configured to provide a lower pressure drop relative to a specific flow rate. In this regard, the static mixers, reactor, system, and processes, as described herein, may be provided with parameters suitable for industrial application. The above pressure drops may be maintained where the volumetric flow rate is at least 0.1, 0.5, 1, 1.5, 2, 2.5, 3, 3.5, 4, 4.5, 5, 6, 7, 8, 9, 10, 20, 30, 40, 50, 100, 500, 1000 ml/min.

The process may involve a mean residence time in the static mixer or reactor in a range of about 1 second to about 5 hours. The mean residence time (in minutes) may, for example, be less than about 300, 250, 200, 150, 120, 100, 80, 60, 45, 30, 15, 10, 9, 8, 7, 6, 5, 4, 3, 2, 1, 0.5 or 0.1. The mean residence time (in minutes) may, for example, be greater than about 0.1, 0.5, 1, 2, 3, 4, 5, 6, 7, 8, 9, 10, 15, 30, 45, 60, 80, 100, 120, 150, 200, or 250. The mean residence time may be provided as a range selected from any two of these previously mentioned values. For example, the mean residence time may be in a range of 2 to 10, 3 to 8, 4 to 7, or 5 to 6 minutes.

The process may provide a product conversion rate (% reactant converted to product) of at least 5, 10, 15, 20, 25, 30, 35, 40, 45, 50, 55, 60, 65, 70, 75, 80, 85, 90, 95, 98, or 99%.

The process may involve a heterogeneous catalytic reaction selected from hydrogenations, oxidations, carbon-carbon couplings, and reductive aminations. In one embodiment, the heterogeneous catalytic reaction is a hydrogenation reaction. It will be appreciated that hydrogenation reactions will involve at least a first fluidic reactant being hydrogen and a second reactant being an organic compound capable of hydrogenation. The hydrogen source may be hydrogen gas (molecular hydrogen) or a liquid hydrogen donor. A pre-step for hydrogenation may be introducing hydrogen gas for pre-activation, for example at a lower flow rate before introducing an organic compound capable of hydrogenation.

For heterogeneous reactions involving mixtures of gases and liquids, the gas: liquid ratio (volume/volume) may be at least 1:1, 2:1, 3:1, 4:1, 5:1, 6:1, 7:1, 8:1, 9:1, 10:1, 11:1, 12:1, 13:1, 14:1, or 15:1. The gas: liquid ratio (volume/volume) may be less than 15:1, 14:1, 13:1, 12:1, 11:1, 10:1, 9:1, 8:1, 7:1, 6:1, 5:1, 4:1, 3:1, or 2:1. The gas: liquid ratio (volume/volume) may be provided as a range selected from any two of these previously mentioned values. For example, the gas: liquid ratio may be in a range of 2:1 to 6:1.

The catalyst or catalyst material on the static mixer may require a chemical or physical (heating) pre-activation process step, for example for hydrogenations pre-activating by exposure of the catalyst material to molecular hydrogen or a source of hydrogen. In one embodiment, the catalyst material on the scaffold is pre-activated, for example by contacting with an activating fluid (e.g. hydrogen gas) for at least 1, 2, 5, 10, 15, 20, 25 or 30 minutes. The pre-activation may occur for less than 30, 25, 20, 15, 10, 5, 2, or 1 minutes. The pre-activation may occur for less than 30, 25, 20, 15, 10, 5, 2, or 1 minute. The pre-activation may occur between a range of any two of the above time values.

The catalytic reactions may be hydrogen insertion reactions that involve the use of hydrogenation catalysts. A hydrogen insertion or hydrogenation catalyst facilitate the insertion of hydrogen into intramolecular bonds of a reactant, e.g., a carbon-oxygen bond to form the oxygen containing organic materials described above, conversion of unsaturated bonds to saturated bonds, removal of protection groups such as converting O-benzyl groups to hydroxyl groups, or reaction of a nitrogen triple bond to form ammonia or hydrazine or mixtures thereof. The hydrogen insertion or hydrogenation catalyst may be chosen from the group consisting of cobalt, ruthenium, osmium, nickel, palladium, platinum, and alloys, compounds and mixtures thereof. In an embodiment, the hydrogen insertion or hydrogenation catalyst comprises or consists of platinum or titanium. In ammonia synthesis the catalyst may facilitate the dissociative adsorption of a hydrogen species source and a nitrogen species source for subsequent reaction. In a further embodiment, the hydrogen insertion or hydrogenation catalyst is coated using electro-deposition or cold spray.

Design Process

The design process may comprise any of the embodiments previously described herein relating to the process for preparing the catalytic static mixer (CSM) element comprising additive manufacturing, such as 3D printing. The additive manufacturing provides flexibility in preliminary design and testing, and further re-design and re-configuration of the static mixers to facilitate development of more commercially viable static mixers.

A process for design and manufacture of a catalytic static mixer (CSM) element for a continuous flow chemical reactor chamber may comprise the steps of:

designing a prototype static mixer element comprising a scaffold defining a plurality of passages configured for mixing one or more fluidic reactants during flow and reaction thereof through the mixer;

additive manufacturing the prototype static mixer element;

applying a catalytic coating to the surface of the scaffold of the prototype static mixer element to form a prototype catalytic static mixer (CSM) element;

testing the prototype CSM for at least one of suitability for catalytic coating or operational performance and durability in a continuous flow chemical reactor;

redesigning the static mixer element to enhance at least one of suitability for catalytic coating or operational performance and durability in a continuous flow chemical reactor; and manufacturing the redesigned static mixer element comprising a redesigned scaffold defining a plurality of passages configured for mixing one or more fluidic reactants during flow and reaction thereof through the mixer, and applying a catalytic coating to the surface of the scaffold to form the catalytic static mixer (CSM) element.

The process for preparing the catalytic static mixer (CSM) element may be a process for the design of at least one of performance, durability and manufacturability of the CSM. The step of applying the catalytic coating to the surface of the scaffold may comprise or consist of electrodeposition or cold spray. The scaffold and catalytic coating may be provided by any embodiments thereof as described herein. The manufacturing of the re-designed static mixer element may be by various methods known in the art, for example casting (e.g. investment casting) or additive manufacture. The step of testing the CSM, re-designing the static mixer element and manufacturing the CSM may be repeated one or more times to further enhance at least one of performance, durability, manufacturability, or scaffold suitability for catalytic coating.

Computational fluid dynamics (CFD) software can be used in the design (or re-design) to obtain various enhanced configurations of the CSMs and scaffolds, which will by determined by the desired applications and associated catalytic reactions. For example, a design process can be used to develop configurations and geometries having enhanced microscopic and macroscopic mixing properties, which may be indicated by the turbulent length scales in turbulent flow, in the vicinity of the scaffold and hence the catalyst, while also providing enhanced heat transfer properties.

A design process may comprise use of software, such as CAD geometry creation software (e.g. SolidWorks). A design (or re-design) step, or process for preparing the static mixer, may comprise the use of software analysis, such as CAD geometry creation software (e.g. SolidWorks) and/or CFD. For example, a design (or re-design) step, or process for preparing the static mixer, may comprise the following steps:

1a. Determine an initial configuration for the scaffold of the CSM using software, for example CAD geometry creation software. An initial configuration may be determined based on a desired particular characteristic such as maximum surface area or those that are more suitable for a particular metal deposition process, such as line of sight accessibility for cold spraying.

1b. Optionally prepare a 3D physical model of the scaffold or CSM with the initial configuration from step 1a.

1c. Optionally investigate and determine the suitability of the configuration of the CSM for manufacturing such as for 3D printing, cold spraying or electroplating. If changes are desired, the previous step can be repeated.

1d. Convert to a format readable by CFD software, for example an "stl" file format.

A further step may be provided comprising a CFD modelling software package (e.g. Flow-3D, ANSYS CFX, ANSYS Fluent). The CFD modelling process may comprise one or more of the following steps:

2a. Import configuration or geometry file (e.g. in STL format) into the CFD modelling software.

2b. Form a mesh to model the geometry, for example the entire geometry of the reaction chamber is broken down into finite volumes within each of which the fluid dynamics equations are solved.

2c. Assign material properties;

2d. Assign physics-determine what processes are operating, e.g. turbulence effects, surface tension effects, heat transfer, etc.

2e. Optionally assign tracer particles—e.g. if we want to see how the mixing is taking place.

2f. Assign initial conditions, for example velocity and pressure at the inlet, temperature if required, kinetic energy if required.

2g. Assign boundary conditions, which inform the software what happens at the external boundaries of the mesh, i.e., where is the inlet, outlet, walls, symmetry, etc.

2h. Assign mathematical parameters, which guide the solution process so that results can be obtained in a reasonable length of time at the accuracy level desired.

2i. Post-process-assess results (e.g. turbulent length scales, temperatures).

A method of preparing a static mixer comprising a scaffold using computational fluid dynamics (CFD) software for enhancing the configuration of the scaffold for a pre-determined catalytic application may comprise the steps of:

1a. determining an initial configuration for the scaffold using CAD geometry creation software;

1b. optionally preparing a 3D physical model of the scaffold with the initial configuration from step 1a;

1c. optionally determining the suitability of the configuration of the scaffold for additive manufacturing and surface deposition techniques, and optionally repeating steps 1a to 1c;

1d. converting first electronic data from the CAD geometry software to second data in a format readable by CFD software; and 2. performing a CFD modelling process.

In an embodiment, step 2 of the above method may comprise steps of:

2a. importing the second data into CFD software;

2b. forming a mesh to model the geometry; and 2c. assigning material properties and assessing results.

The design process may also comprise an iterative approach to optimise or enhance at least one of performance, durability, manufacturability, or scaffold suitability for catalytic coating. For example, if the results can be enhanced by certain changes to the geometry, then changes (based on knowledge of fluid dynamics) can be made to the geometry and the design optimisation procedure repeated.

The initial geometry may be chosen and optimised to enhance various characteristics of the static mixer element, such as the specific surface area, volume displacement ratio, line-of-sight accessibility for cold-spraying, strength and stability for high flow rates, suitability for fabrication using additive manufacturing, or to achieve a high degree of chaotic advection, turbulent mixing, catalytic interactions, or heat transfer. These characteristics, as well as any other characteristics of interest, may be weighted based on their relative importance to a particular application, and the design optimisation process can be directed towards enhancing the characteristics which are given more weight.

It will be appreciated that mixing refers to the process by which two (or more) separate constituents of the flow (i.e. different chemical species or scalar constituents with different values, e.g. temperature) are brought together eventually and interact at a molecular level.

Figure 17:
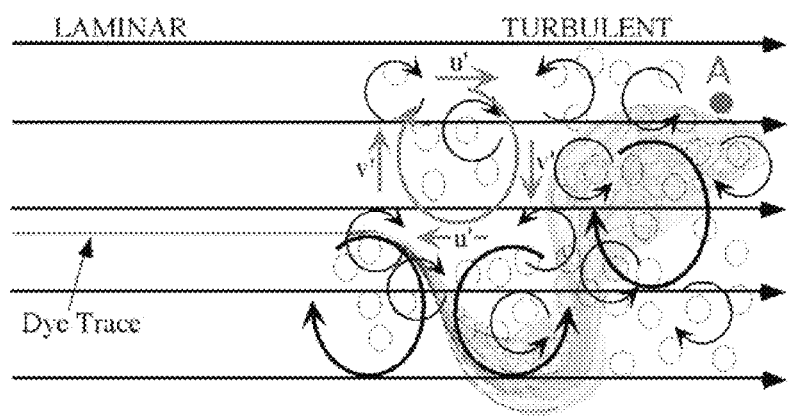
FIG. 17 shows tracer transport in laminar and turbulent flows.

In FIG. 17, the straight, parallel black lines are streamlines, which are parallel to the mean flow. In laminar flow the fluid particles follow the streamlines exactly, as shown by the linear dye trace in the laminar region. In turbulent flow eddies of many sizes are superimposed onto the mean flow. When dye enters the turbulent region it traces a path dictated by both the mean flow (streamlines) and eddies. Larger eddies carry the dye laterally across streamlines. Smaller eddies create smaller scale stirring that causes the dye filament to spread (diffuse). It is the diffusion that creates the local mixing of constituents that are transported to various locations by larger eddies.

The description of turbulence requires at least two quantities: 1. the intensity of turbulence indicated by the "turbulent kinetic energy" in the turbulent fluctuations, and 2. the scale around which this energy is concentrated, represented by the peak in the turbulence spectrum, or equivalently the "turbulence length scale". A flow with a higher turbulent kinetic energy would therefore involve more vigorous mixing whilst a flow with a higher turbulent length scale would indicate that mixing occurs across a wider region.

The CFD procedure also enables further complexities to be considered, such as fluid temperature and associated property of the catalytic static mixers in flattening out temperature gradients, two-component flows including gas bubbles, and micro-mixing models which will increase the resolution of models and provide an indication as to how mixing occurs at the molecular level (which is the length scale for chemical reactions).

Catalyst Screening Method

There is also provided a method of screening a catalyst or catalyst material for catalytic reactivity using a static mixer element or system as described herein, comprising the steps of:

providing a continuous flow chemical reactor comprising a static mixer comprising a predetermined catalyst or catalyst material;

operating the reactor at a predetermined setting; and determining the % of product obtained from an output stream.

The catalyst screening method may be used to determine an effective or optimal catalyst material for use in a predetermined reaction or reaction type, and for example in a given chemical flow reactor operating under predetermined conditions or at a predetermined setting. The screening method may also be used to determine whether a specific catalyst is effective or advantageous when used in a particular application. A number of different catalyst materials may be selected and screened for a particular application in order to determine which provides the best yield or is most effective for the particular application. Each particular application may include any of the chemical reactors described herein, set to any suitable operating configuration such as any of the operating conditions described herein, in order to establish any of the reactions or reaction types described herein. The catalyst materials selected for screening may comprise any potentially suitable catalysts, such as any of the catalysts described herein or a compound comprising any of the catalysts described herein described herein. The catalyst materials may be coated onto the surface of a static mixer scaffold using any of the deposition methods described herein, and the screening method may also be used to compare the effectiveness of different deposition methods instead of or as well as comparing different catalyst materials.

EXAMPLES

The present disclosure is further described by the following examples. It is to be understood that the following description is for the purpose of describing particular embodiments only and is not intended to be limiting with respect to the above description.

Referring to FIG. 1 and Table 1, a number of different static mixers were manufactured for experimental purposes each in a set of four identical static mixers for operation in series together in a continuous flow hydrogenation reactor. Ni-EP-CoCr-A-P2-6 is a 3D printed static mixer, containing a nickel catalyst layer (Ni) that was electroplated (EP) on a cobalt chromium alloy scaffold (CoCr) with a scaffold design configuration A-P2-6. Ni-EP-Ti-A-P2-3 is a 3D printed static mixer, containing a nickel catalyst layer (Ni) electroplated (EP) on a titanium scaffold (Ti) with a scaffold design configuration A-P2-3. Ni-CS-Ti-A-P2-1 is a 3D printed static mixer, containing a nickel catalyst layer (Ni) that was cold sprayed (CS) on a titanium scaffold (TI) with a scaffold design configuration A-P2-1. Ni-CS-SS-C-R1-4 is a static mixer, containing a nickel catalyst layer (Ni) that was cold sprayed (CS) on a stainless steel (SS) scaffold with a scaffold design configuration C-R1-4. Pt-EP-Ti-A-P1-5 is a 3D printed static mixer, containing a platinum catalyst layer (Pt) that was electroplated (EP) on a titanium scaffold (Ti) with a scaffold design configuration A-P2-2.

TABLE 1

Static mixer (SM) used in the experiments described below.

| CSM ident | $m_{CSM}$ [g] | $m_{cat}$ [g] | $V_{displaced}$ [ml] | $V_{reactor}$ [ml] | $\phi$ [%] |
|---|---|---|---|---|---|
| Ni-EP-CoCr-A-P2-6 | 24.4 | 1.0 | 3.1 | 13.9 | 81.7 |
| Ni-EP-Ti-A-P2-3 | 11.5 | N/V | 2.7 | 14.3 | 84.3 |
| Ni-CS-Ti-A-P2-1 | 11.3 | 2.0 | N/V | N/V | N/V |
| Ni-CS-SS-C-R1-4 | 15.6 | 3.3 | 2.0 | 15.0 | 88.2 |
| Pt-EP-Ti-A-P1-5† | 16.2 | N/V | 2.9 | 14.1 | 83.2 |
| X-X-Ti-A-P2-2 | 9.6 | 0.0 | 2.1 | 14.9 | 87.5 |

$m_{CSM}$ = total mass of set of four CSMs (the continuous flow reactor can house four CSMs at a time); $m_{cat}$ = total mass of catalyst on this set of CSMs; $V_{displaced}$ = total volume displacement of this set of four CSMs; $V_{reactor}$ = reactor volume left when CSMs are inserted into the reactor module (empty volume = 17 ml); $\phi$ = porosity of the CSM (see equation 1).
†The set Pt-EP-Ti-A-P1-5 consisted only of three catalytic mixers coated with Pt, and a fourth uncoated, non-catalytic static mixer.

The porosity of the CSM, $\phi$, can be calculated using the following:

$$\Phi = \frac{V_{reactor}}{4(\frac{\pi}{4}d^2 l)} = \frac{\pi d^2 l - V_{displaced}}{\pi d^2 l} = 1 - \frac{V_{displaced}}{\pi d^2 l} \quad (1)$$

Additive Manufacture of Metal Scaffolds

All SMs were manufactured on the Arcam A1 electron beam 3D printer using either TiAl64V powders (45-105 micrometre diameter range) or the cobalt-chrome superalloy FSX-414 powders. The machine process parameters were set by trial and error for FSX-414 but were known for Ti6Al4V through previous experience with builds on the alloy. The catalyst was then either cold sprayed or electrodeposited onto the metal scaffolds.

Cold Spraying of Catalyst onto the Metal Scaffolds

Twelve different scaffolds were coated using different cold spraying systems and processes as shown in Table 2. The conditions which produced the most optimal metallurgical bonding and porosity in the catalytic layer are given in rows 8 to 11.

TABLE 2

Cold spray conditions for nickel coatings.

| | Weight g | Gas Temp ° C. | Gas Press Mpa | Traverse Speed mm s$^{-1}$ | Total Passes | Turns | Feed Rate rpm | Stand-off mm | Ni Loading |
|---|---|---|---|---|---|---|---|---|---|
| 1 | 4.56 | 700 | 3.5 | 200 | 8 | 2 sides (halves) | 1 | 30 | 0.65 |
| 2 | 3.51 | 700 | 3.5 | 200 | 2 | 1 side | 1 | 30 | 0.16 |
| 3 | 3.30 | 700 | 4.0 | 200 | 8 | 2 sides (halves) | 1 | 30 | 0.90 |
| 4 | 2.88 | 700 | 4.0 | 200 | 4 | 1 side | 1 | 30 | 0.58 |
| 5 | 2.30 | 700 | 4.0 | 200 | 4 | 4 sides (quarters) | 1 | 30 | 1.56 |
| 6# | 2.28 | 700 | 4.0 | 400* | 4 | 4 sides (quarters) | 0.5 | 30 | 0.53 |
| 7# | 2.47 | 700 | 4.0 | 400 | 4 | 4 sides (quarters) | 0.5 | 30 | 0.34 |
| 8# | 2.31 | 700 | 4.0 | 300 | 4 | 4 sides (quarters) | 0.5 | 30 | 0.53 |
| 9# | 2.30 | 700 | 4.0 | 300 | 4 | 4 sides (quarters) | 0.5 | 30 | 0.57 |
| 10 | 3.08 | 700 | 4.0 | 300 | 4 | 4 sides (quarters) | 0.5 | 30 | 0.55 |
| 11 | 3.15 | 700 | 4.0 | 300 | 8 | 4 sides (quarters) | 0.5 | 30 | 1.00 |
| 12** | 3.12 | 700 | 4.0 | 300 | 4 | 4 sides (quarters) | 0.75 | 30 | 1.08 |
| 13## | 3.08 | 700 | 4.0 | 300 | 4 | 4 sides (quarters) | 0.75 | 30 | 0.67 |

*1$^{st}$ Pass at 200 mm/s; #Used for hydrogenation trials; **1$^{st}$ pass at 1.0 rpm feed; ##1 side moved during spray edge only sprayed.

In the cold spray method the scaffold was held in an aluminium tube which was opened on one side as shown in FIG. 7A. This arrangement allowed the scaffold to be cold sprayed effectively and at the same time prevented the force of the carrier gas from fracturing of the scaffold. A Plasma Giken PCS-1000 cold spray system, fitted with a water-cooled, one-piece, tungsten carbide nozzle with a 3 mm throat, was used to spray nickel powder (−20 to +10 micron spherical particles). The cold spray parameters given in rows 8 to 11 of Table 2 produced coatings with high porosity and high metallurgical bonding according to the SEM and optical pictures of the cold sprayed 3D scaffolds shown in FIG. 8A to 8D.

Electro Deposition of Catalyst onto the Metal Scaffold

In the electrodeposition method, copper, nickel and platinum were deposited onto Ti-6A1-4V alloy or Co—Cr static mixer scaffolds using an electrochemical flow cell. The SM becomes the cathode and sits at the centre of the cell surrounded by the anode. The concentric geometry maintains an even current distribution.

Electrodeposition is useful for this application because deposition is not restricted to line of sight, many metals and alloys are possible including precious metals that are hard to deposit efficiently using other methods, and the process is quick and inexpensive. The procedure involved selecting suitable solution chemistry, surface pre-treatment of the mixer, developing effective pulsed current profiles and post deposition cleaning. Each different scaffold mixer material and catalytic coating may require different plating conditions. When the conditions are carefully controlled, substantially uniform coatings of the catalytic metal were produced FIG. 9A and FIG. 9B.

Flow Reactor Experiments

The continuous flow reactor set-up is shown in the flow diagram of FIG. 10. The set-up consists of the reactor module, which is housing the catalytic inserts, a liquid feed line, including a liquid reagent pump (Gilson 305 HPLC pump), a gas feed line, and electronic process control and data logging.

As depicted in FIG. 10, the reactor module contains four reactor zones, each of which are made from 15 cm long stainless steel tubing (Swagelok, 8 mm OD, 6 mm ID). It also contains five temperature probes (PT-100), situated before and after each reactor zone.

The reactor module can be dismantled easily in order to facilitate change-over of the catalytic inserts. The reagent pump supplies the substrate feed stream, which contains a solution of the starting material substrate, neat or in a solvent. The hydrogen gas is supplied from a hydrogen cylinder (G-type cylinder) and mixed with the liquid stream in a T-piece. The combined stream then flows through a liquid-gas disperser (Swagelok SS-4TF-90) before it enters the reactor. The pressure at inside the reactor is regulated by a diaphragm back pressure regulator (BPR, Swagelok KBP1J0A4D5A20000), which is situated at the outlet of the reactor.

After passing through the BPR, the hot effluent can optionally be cooled in a coil type heat exchanger, which is operated with tap water as the cooling fluid. The product stream is then collected in a bottle or flask for further post processing.

Further safety components and process control and monitoring equipment is installed in the rig: safety pressure relief valve at reactor inlet (Swagelok, SS-4R3A); safety shut-down valve in the gas line (Bürkert, 2/2-way solenoid valve 6027-A03); flash-back arrestor (Witt 85-10) in the gas line; mass flow controller in the gas line (Bronkhorst, MFC F-201CV-500); and pressure sensors in the liquid line, gas line and at the inlet of the reactor (pL, pG, pR).

The reaction occurs at the solid-liquid interface of the catalytic inserts, inside the four reactor zones. The operation of the reactor system is controlled by Lab View software, which was written in house. Temperature, pressure and gas flow rate data is also monitored by the Lab View control program.

The above mentioned configuration is tailored for hydrogenation reactions; with minimal changes to the apparatus, the reactor system can also be used for metal catalysed C—C coupling reactions, oxidations or other organic reactions.

In order to evaluate this reactor for hydrogenation reactions, a series of experiments were conducted investigating the hydrogenation of oleic acid (OA, see Scheme 1), vinyl acetate (Vac), and cinnamaldehyde (CAL, see Scheme 2).

Scheme 1. Reduction of oleic acid to stearic acid on a nickel catalyst using hydrogen.

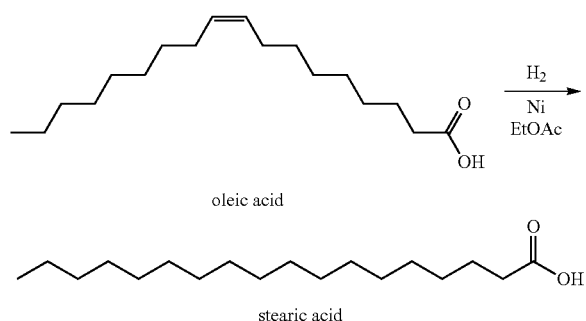

Scheme 2. Reduction of cinnamaldehyde (CAL), yielding cinnamyl alcohol (COH), hydrocinnamaldehyde (HCAL) and hydrocinnamyl alcohol (HCOH).

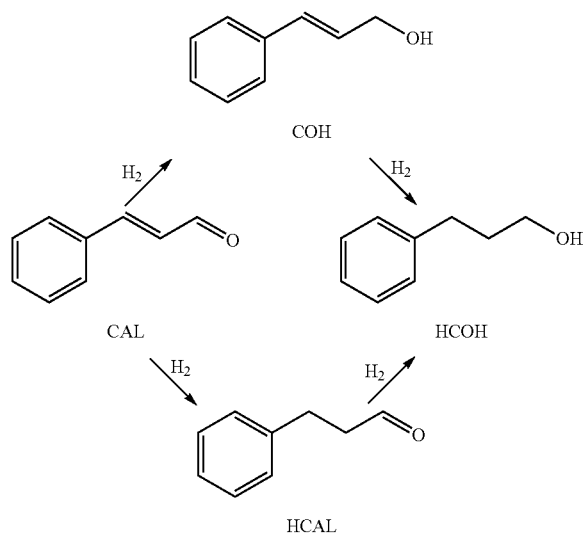

A typical hydrogenation reaction on the above reactor configuration was conducted as follows. First the catalytic inserts inside the reactor were activated by flowing hydrogen over them at 16 bar, 180° C. and a gas flow rate of 100 $mL_N$/min. The activation was conducted for several hours (between 2.5 and 6 h). After activation the reactor was flushed with the solvent, ethyl acetate (EtOAc), using the liquid reagent pump. The substrate, oleic acid was dissolved in ethyl acetate to a concentration of 1 mol/L.

Before start of the reaction, the hydrogen gas was introduced, together with the washing solvent, and the parameters for the reaction were adjusted: pressure inside reactor, pR=16 bar, liquid flow rate, VG,R=0.25 ml/min, gas flow rate inside the reactor, VG,R=2.05 mL/min (VG,N=21.2 $mL_N$/min), reactor temp, TR=140° C.

Once pressure and temperature had stabilised, the substrate (OA) was fed into the reactor by changing over the reagent pump from pure solvent to the prepared clear stock solution. The combined flow rate through the reactor was 2.3 mL/min, resulting in a mean residence time, r, of 6 min. 6 min after start of the reaction, the product was collected at the outlet of the reactor in several fractions. The fractions containing product were combined and the solvent removed by evaporation.

A white waxy solid (stearic acid) was recovered after solvent removal, which was then analysed by 1H-NMR and GC. Reaction conversions were calculated from 1H NMR spectra, which were recorded on a Bruker AC-400 spectrometer in deuterated chloroform (from Cambridge Isotope Laboratories Inc.). The residual solvent peak at $\delta$=7.26 ppm was used as an internal reference. Product compositions were analyzed by GC-FID and GC-MS.

The GC-FID results were also used to confirm NMR conversions and to calculate GC-based yields. GC-mass spectra were obtained with a Perkin Elmer Clarus 600 GC mass spectrometer using electron impact ionization in the positive ion mode with ionization energy of 70 eV. The gas chromatography was performed with a Perkin Elmer Elite-5 MS GC column (30 m×0.25 mm ID, 0.25 μm film thickness), with a temperature program of 40° C. for 2 minutes, then heating at 10° C./min to 280° C. where the temperature was held for 4 minutes with a split ratio of 70, an injector temperature of 250° C. and the transfer line was set to 250° C. Ultra-high purity helium was used as the carrier gas with a flow rate of 0.7 ml/min.

GC-FID analysis was performed on an Agilent 6850 Series II gas chromatograph with a split/splitless inlet and a detector temperature of 250° C. Separation was done on a Grace BPX5 capillary column (25 m×0.32 mm ID, 0.50 μm film thickness), with a temperature program of 40° C. for 2 minutes, then heating at 10° C./min to 280° C. where the temperature was held for 4 minutes with a split ratio of 50 and an injector temperature of 200° C. High purity helium was used as the carrier gas with a flow rate of 2.4 ml/min. The reagents oleic acid was obtained from Sigma Aldrich; the solvents ethyl acetate (EtOAc), ethanol (EtOH), isopropanol (iPrOH) were obtained from Merck KGaA. All reagents and solvents were used without further purification.

Table 3 shows experimental data from the hydrogenation reactions using oleic acid, vinyl acetate and cinnamaldehyde, and the CSMs described in Table 1.

TABLE 3

Experimental data from the hydrogenation reactions using oleic acid (OA); vinyl acetate (VAc) and cinnamaldehyde (CAL).

| | Catalyst | Substrate | Pressure [bar] | Temp. [° C.] | $V_{tot}$ [ml/min] | G/L | τ [min] | Conversion [%] |
|---|---|---|---|---|---|---|---|---|
| 1 | Ni-CS-Ti-A-P2-1 | OA | 16 | 140 | 2.3 | 3.6 | 6.4 | 16 |
| 2 | Ni-CS-Ti-A-P2-1 | OA | 16 | 140 | 2.3 | 6.7 | 6.4 | 20 |
| 3 | X-X-Ti-A-P2-2 | OA | 16 | 140 | 2.3 | 3.6 | 6.5 | 0 |
| 4 | Ni-EP-Ti-A-P2-3 | OA | 16 | 140 | 2.3 | 3.6 | 6.2 | 9 |
| 5 | Ni-CS-SS-C-R1-4 | OA | 16 | 140 | 2.3 | 3.6 | 6.5 | 26 |
| 6 | Ni-CS-SS-C-R1-4 | OA | 16 | 140 | 2.3 | 0.9 | 6.5 | 1 |
| 7 | Ni-CS-SS-C-R1-4 | OA | 16 | 140 | 2.3 | 2.8 | 6.5 | 20 |

TABLE 3-continued

Experimental data from the hydrogenation reactions using oleic acid (OA);
vinyl acetate (VAc) and cinnamaldehyde (CAL).

|   | Catalyst | Substrate | Pressure [bar] | Temp. [° C.] | $V_{tot}$ [ml/min] | G/L | τ [min] | Conversion [%] |
|---|---|---|---|---|---|---|---|---|
| 8 | Ni-CS-SS-C-R1-4 | OA | 16 | 140 | 2.3 | 8.2 | 6.5 | 44 |
| 9 | Ni-CS-SS-C-R1-4 | OA | 16 | 140 | 2.3 | 10.5 | 6.5 | 55 |
| 10 | Ni-CS-SS-C-R1-4 | OA | 16 | 140 | 2.3 | 5.6 | 6.5 | 27 |
| 11 | Pt-EP-Ti-A-P1-5 | OA | 16 | 140 | 2.3 | 3.6 | 6.1 | 21 |
| 12 | Ni-EP-CoCr-A-P2-6 | OA | 16 | 140 | 2.3 | 3.6 | 6.0 | 1 |
| 13 | Ni-CS-SS-C-R1-4 | VAc | 22 | 140 | 3.0 | 5.0 | 5.0 | 74 |
| 14 | Pt-EP-Ti-A-P1-5 | VAc | 16 | 140 | 3.0 | 5.0 | 4.7 | 100 |
| 15 | Ni-EP-CoCr-A-P2-6 | VAc | 20 | 140 | 3.0 | 5.0 | 4.6 | 15 |
| 16* | Pt-EP-Ti-A-P1-5 | CAL | 20 | 140 | 3.0 | 5.0 | 4.7 | 89* |

$V_{tot}$ = total volumetric flow rate through reactor at the given temperature and pressure (combined gas and liquid flow); G/L = ratio of gas to liquid flow; τ = hydraulic residence time inside reactor; the solvent was EtOAc and the concentration of substrate was between 1 and 2 mol/L; *) CAL was converted to 89%, giving a range of different hydrogenation products: HCOH 16%, COH 61%, HCAL 7%, CAL 11%, others 5% (see Scheme 2).

Table 3 shows a comparison of the performance of the different prepared sets of SMs from Table 1 under similar conditions. It can be seen that the G/L ratios and selection of scaffold material, coating method and catalysts can have an effect on the hydrogenation (conversion %) of the substrate. The control experiment using an uncoated set of SMs (X-X-Ti-A-P2-2) did not result in any hydrogenation of the oleic acid. The highest observed conversion in this set of experiments for oleic acid was 55% (entry 9 in Table 3). The product streams of the experiments resulting in ~10% conversion or higher were cloudy and after solvent removal a white waxy solid was obtained.

Figure 11:
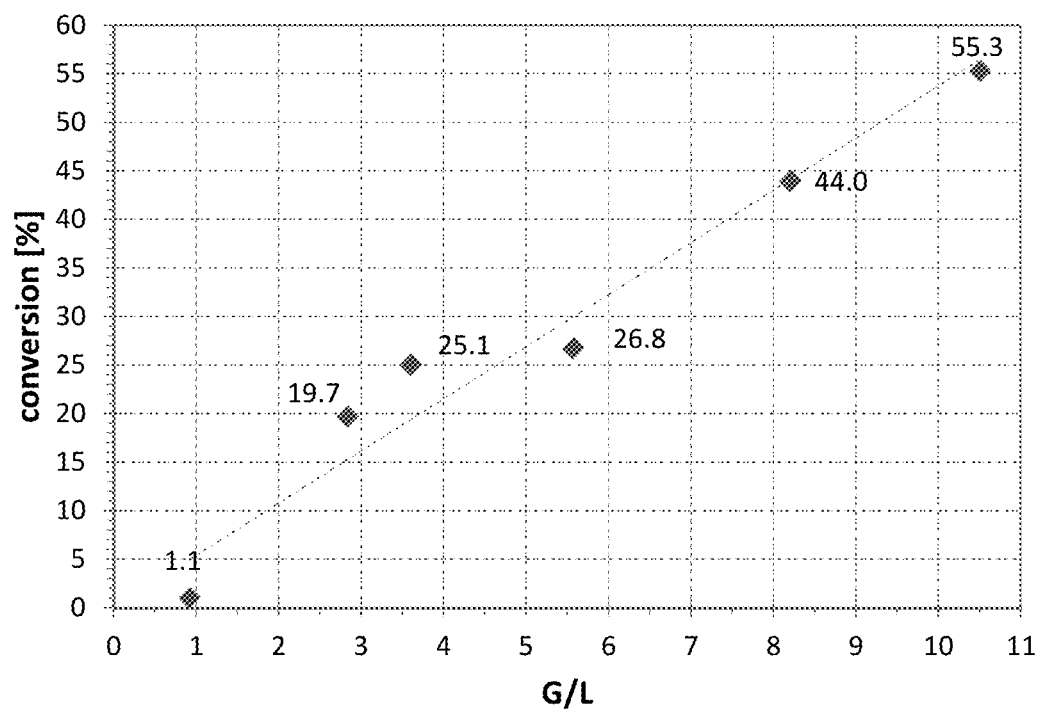
FIG. 11 shows influence of gas-to-liquid ratio on conversion, using catalyst set Ni-CS-SS-C-R1-4 according to an embodiment and oleic acid as substrate, solvent: EtOAc, pressure=16 bar, T=140° C., total flow rate=2.30 ml/min, $\tau$=6.5 min.
Figure 12:
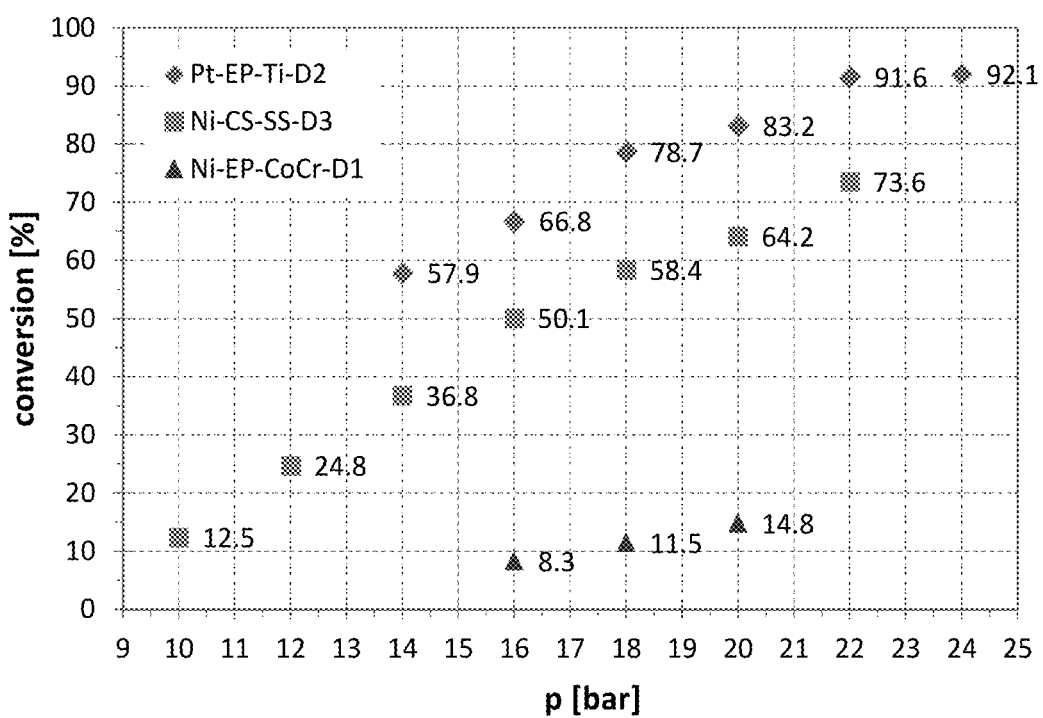
FIG. 12 shows influence of reactor pressure on conversion, using three different catalyst sets according to some embodiments and vinyl acetate as substrate, solvent: EtOH, T=140° C., total flow rate=2.30 ml/min, G/L=5.00, $\tau$=4.6 to 5 min.

The parameters G/L and reactor pressure were found to have a significant impact on the performance of the reactor, hence these two parameters were studied in more detail. FIG. 11 presents a parameter study for the hydrogenation of OA on Ni-CSMs, showing a linear increase of conversion with G/L where higher amounts of hydrogen should increase conversion. A similar trend was observed, when the reactor pressure was varied (see FIG. 12) for the hydrogenation of VAc. Here, three different catalyst sets were tested, one of which resulted in very high conversions at pressures above 20 bar, where an asymptotic deviation from the otherwise linear behaviour was observed. Table 3 contains a condensed set of these experiments, conducted at varying conditions and with six different catalyst sets. Entry 3 is a control experiment using a set of non-catalytic mixers; here no conversion was observed. The product streams of the experiments with OA resulting in >10% conversion were cloudy and after solvent removal a white waxy solid was obtained. This material was noticeably different from the clear stock solution which was pumped into the reactor. This is a clear indicator of the success of the hydrogenation reaction, as a waxy solid, stearic acid, was formed from a viscous oil, oleic acid.

Figure 13:
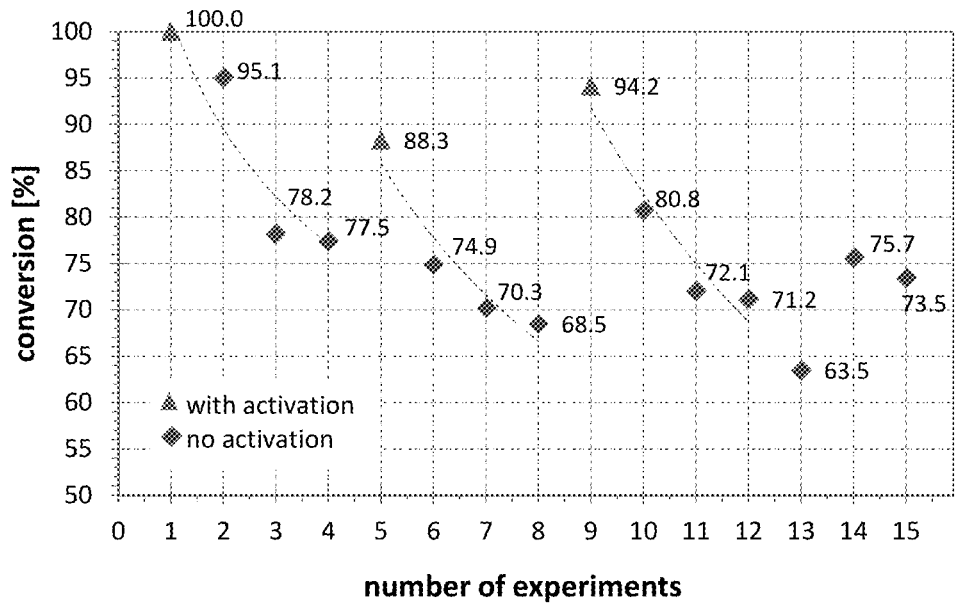
FIG. 13 shows activation study using catalyst set Pt-EP-Ti-A-P1-5 and vinyl acetate as substrate, solvent: EtOH, pressure=16 bar, T=140° C., total flow rate=3.00 ml/min, G/L=5.00, $\tau$=4.7 min.

The influence of activation on reactor performance and long term performance of the catalyst was studied by setting up a series of repeat reactions. Here, one set of conditions was chosen and the same reaction was performed multiple times, using the Pt-CSM set, Pt-EP-Ti-A-P1-5. After a certain number of repeats, the catalyst was activated again before further experiments were conducted. FIG. 13 shows the results from this study, demonstrating that with a freshly activated catalyst, the conversions were higher, namely between 88.3 and 100%, while without, they dropped as low as 65.3%. In general, it can be stated that the catalyst retained catalytic activity even after multiple runs, and generally produced moderate to high conversions, generally ~20% lower than a freshly activated catalyst.

Entry 16 in Table 3 shows the hydrogenation of cinnamaldehyde, a substrate containing two reactive moieties, namely a carbonyl group and a double bond. Here Pt-CSMs were used, investigating the selectivity of this catalyst system for the two reactive groups. The experiment resulted in a total conversion of CAL of 89%, whereby the majority, 61% was hydrogenated to the corresponding unsaturated alcohol, cinnamyl alcohol (COH). The hydrogenated aldehyde, hydrocinnamaldehyde (HCAL) was found in 7% and the fully hydrogenated product hydrocinnamyl alcohol (HCOH) was found in 16% (unreacted CAL: 11%, other unidentified products: 5%). This result shows that the Pt catalyst was more active towards reduction of the aldehyde than the double bond.

Figure 14:
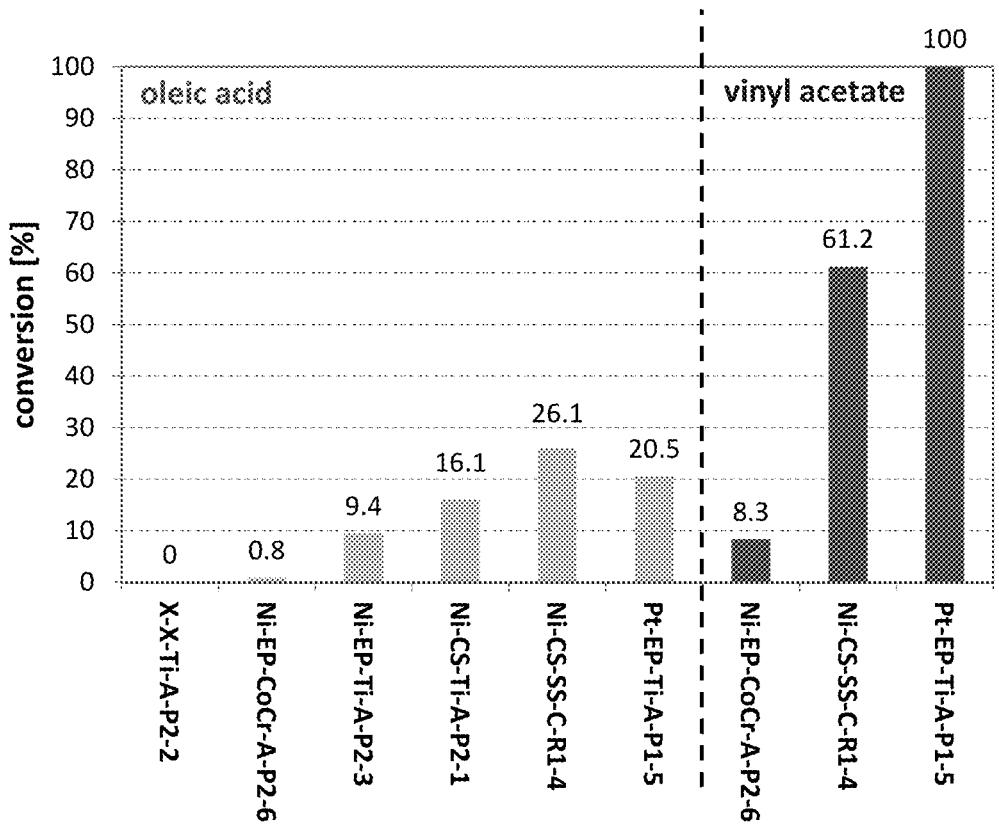
FIG. 14 shows a comparison of six different catalyst sets (see Table 1) for the hydrogenation of oleic acid (yellow bars) and vinyl acetate (blue bars); for OA the following conditions were used: T=140° C., p=16 bar, G/L=3.6, $\tau$=6 min; for VAc the following conditions were used: T=140° C., p=16 bar, G/L=5, $\tau$=5 min.

FIG. 14 shows a comparison of the six different CSM sets used within this study for the two different substrates OA and VAc. While the conversions for OA under these comparative conditions was relatively low for all catalysts, the one that performed best was Ni-CS-SS-C-R1-4 at 26%, and this was also the CSM set containing the highest amount of nickel. The good performance of this set for the hydrogenation of OA is due to the applied catalyst deposition method and to the 3D design of the mixer. Ni-CS-SS-C-R1-4 was the best combination of both, containing a relatively thick Ni-layer on top of a ribbon-like mixer design. Compared to the porous 3D-printed structures shown in FIG. 1, this design was relatively flat and non-porous, which was well suited for line-of-sight deposition techniques such as cold spraying, resulting in a complete coverage of the mixer with nickel. In contrast, a full coverage of the entire surface of porous designs, including the internal pores, is not as feasible by cold spraying. Electroplating on the other hand, being a submersion-based deposition method, is understood to cover even internal pores of these structures. However, the layers that were created by electroplating, where not as thick for the herein chosen conditions and also not as porous as the ones applied by cold-spraying, hence the activity of the sets Ni-EP-CoCr-A-P2-6 and Ni-EP-Ti-A-P2-3 were not as high as their cold spray counterparts. For the reactions with Vac, the Pt-CSM set, Pt-EP-Ti-A-P1-5, outperformed all others, including Ni-CS-SS-C-R1-4. Here we believe that the more active catalyst metal Pt increases the reactivity of the system significantly when compared to the Ni-based CSMs, even though the later contained a larger amount of catalyst.

The Ti alloy mixers appeared to be more susceptible to hydrogen embrittlement. After extended use with gaseous hydrogen, the mixers became porous, lost mechanical stability and started to disintegrate. This became apparent when mixers that have been used for a large number of experiments were removed from the reactor to replace them with fresh ones. In one incident, the mixers fell apart and could only be removed from the reactor pipe in form of coarse metal granules. In comparison no embrittlement was observed with the CoCr alloy CSMs.

Preliminary leaching tests were performed on a set of cold-sprayed Ni CSMs using ICP-OES. For this the reactor was operated for an extended period of time at steady state conditions, processing a total of over 1 L of stock solution. The product stream contained on average 157 ppb Ni, 621 ppb Fe and 34 ppb Cr. These results show that the Ni catalyst is very well bound to the substrate, and that the majority of the soluble metal contamination was likely to come from the stainless steel reactor tubing rather than from the catalytic layer itself, and that the total amount was very low.

Use of Computational Fluid Dynamics (CFD) to Optimise SM Design

Figure 4:
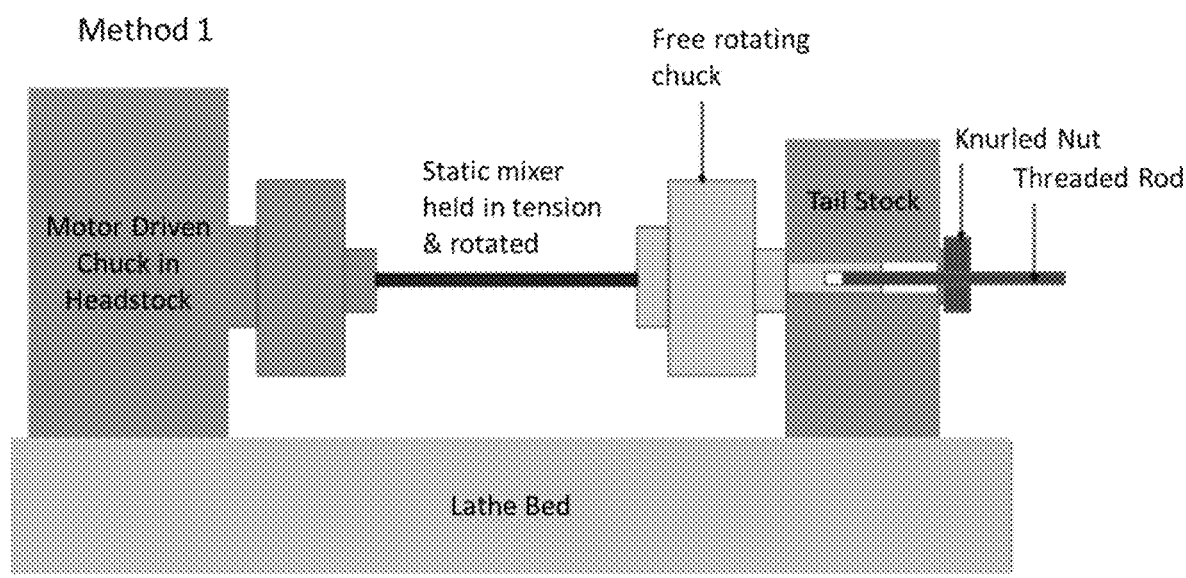
FIG. 4 shows a scaffold support system for cold spraying a scaffold according to some embodiments.

CFD was applied to the design of SMs to ensure that the additively manufactured versions would be better at mixing the reactants as well as present the flowing reactants with the maximum amount of catalytic-deposited surface area. The first design was conceived as a mesh that had a helical geometry with an alternating clockwise and counter-clockwise direction to disrupt the flow and create turbulence (FIGS. 4A and 4B).

CFD analysis showed that this geometry had a significant limitation in that there were straight channels available for the flow to keep to from the start to the end-which meant it experienced minimal disruption.

The geometry may be improved by changing it to avoid straight channels that run parallel to the flow.

Additional Flow Reactor Experiments

Additional catalytic static mixers were prepared and tested in either a 4 static mixer series (4 modules together in series, which is referred to as "4-set") or 12 static mixer series (12 modules together in series, which is referred to as "12 set"). Three systems were tested being Pd-EP-SS-A-3-7 (4 set, Palladium-Electrospray coating, stainless steel and aluminium alloy substrate), Ni-CS-SS-A-2-8 (12 set, Nickle-Cold Spray coating, stainless steel and aluminium alloy substrate), and Pd-EP-SS-A-2-9 (12 set, Palladium-Electrospray coating, stainless steel and aluminium alloy substrate).

Transfer Hydrogenation of Nitro Compounds to Amines Using Mark 1 Reactor (4-Set System)

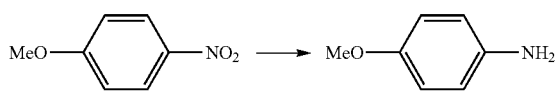

Ammonium formate in methanol in the presence of a palladium coated static mixer was used to generate hydrogen in situ. A solution of p-nitroanisole (153 mg, 1 mmol), and ammonium formate (315 mg, 4.6 mmol) in MeOH (3 mL) was passed through the Mark I reactor, fitted with catalytic static mixer Pd-EP-SS-A-3-7, and heated at 130° C. at 11.5 bar, at a flow rate of 1 mL/min. The eluent was collected and the solvent was evaporated to give p-methoxyaniline at 100% conversion.

Additional reactions were performed in a similar manner with parameters and conversions shown in Table 4.

TABLE 4

| | Catalyst | Substrate | Temp °C. | Pressure (bar) | Product | Conversion % |
|---|---|---|---|---|---|---|
| 1 | Pd-EP-SS-A-3-7 | 4-nitroanisole | 130 | 11.5 | 4-methoxyaniline | 100 |
| 2 | Pd-EP-SS-A-3-7 | 2-nitroanisole | 130 | 11.5 | 2-methoxyaniline | 10 |
| 3 | Pd-EP-SS-A-3-7 | 3-nitroanisole | 130 | 11.5 | 3-methoxyaniline | 20 |
| 4 | Pd-EP-SS-A-3-7 | nitrobenzene | 130 | 11.5 | aniline | 31 |
| 5 | Pd-EP-SS-A-3-7 | nitrobenzene | 130 | 20 | aniline | 36 |
| 6 | Pd-EP-SS-A-3-7 | 4-nitrotoluene | 130 | 20 | p-toluidine | 87 |
| 7 | Pd-EP-SS-A-3-7 | 4-nitrophenol | 130 | 20 | 4-aminophenol | 17 |

Rxns run in MeOH. Flow rate = 1 ml/min. Concentration = 0.33M.

Dehalogenation of Acetophenone Via Transfer Hydrogenation Using Mark 1 Reactor

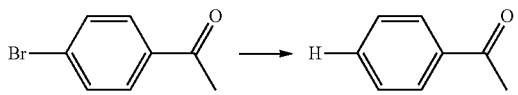

Ammonium formate in methanol in the presence of a palladium coated static mixer was used to generate hydrogen in situ. A solution of 4-bromo acetophenone (100 mg, 0.5 mmol), and ammonium formate (510 mg, 7.5 mmol) in MeOH (3 mL) was passed through the Mark I reactor, fitted with catalytic static mixer Pd-EP-SS-A-3-7, and heated at 130° C. at 12 bar, at a flow rate of 1 mL/min. The eluent was collected and the solvent was evaporated to give acetophenone (65%), 4-bromo acetophenone (33%), and 2% of the acetophenone homodimer.

Mark 2 Reactor

The Mark 2 continuous flow reactor set-up is similar to that for the Mark 1 reactor, with a liquid line feed, a liquid reagent pump (Gilson 305 HPLC pump), a gas feed line and electronic process control and data logging. The Mark 2 reactor however houses 12 catalytic inserts instead of 4.

Catalysts may be pre-activated by passing hydrogen gas through the reactor, for example at 20bar for 1 h at 120 deg C.

For given substrate parameters such as temperature, solvent, pressure, liquid flow rate, hydrogen gas flow rate, and concentration, these may be varied to determine the best reaction conditions for conversion of the substrate to product.

This process was used for a variety of substrates with the best reaction conditions listed in Table 5.

Reduction of Vinyl Acetate to Ethyl Acetate Using Mark 2 Reactor (See Entry 1, Table 5)

A solution of vinyl acetate (30 mL, 2M in EtOH) was passed through the Mark 2 reactor, fitted with catalytic static mixer Ni-CS-SS-A-2-8, at 120° C. at 24 bar, at a liquid flow rate of 1 mL/min and a hydrogen gas flow rate of 5 mL/min. The eluent was collected to give ethyl acetate at 100% conversion.

Additional reactions were performed in a similar manner with parameters and conversions shown in Table 5.

TABLE 5

| | Catalyst | Substrate | Solvent | Conc. Mol/L | Press. (bar) | $V_L$ ml/min | $V_G$ ml/min | Conversion |
|---|---|---|---|---|---|---|---|---|
| 1 | Ni-CS-SS-A-2-8 | Vinyl acetate[a] | EtOH | 2 | 24 | 1 | 5 | 100 ethyl acetate |
| 2 | Ni-CS-SS-A-2-8 | Acetophenone | EtOH | 2 | 24 | 1 | 5 | 6 1-phenylethan-1-ol |
| 3 | Ni-CS-SS-A-2-8 | Phenylacetylene | EtOH | 2 | 16 | 1 | 5 | 100 ethyl benzene |
| 4 | Ni-CS-SS-A-2-8 | Benzyl Cyanide[a] | EtOH | 0.5 | 24 | 1 | 10 | 43 phenylethylamine |
| 5 | Pd-EP-SS-A-2-9 | Vinyl Acetate[a] | EtOH | 2 | 16 | 1 | 5 | 100 ethyl acetate |
| 6 | Pd-EP-SS-A-2-9 | Acetophenone | EtOH | 1 | 24 | 1 | 5 | 54 1-phenylethan-1-ol |
| 7 | Pd-EP-SS-A-2-9 | Cinnamaldehyde | EtOH | 1 | 24 | 2 | 8 | 60 3-phenylpropanal<br>37 3-phenylpropanol |
| 8 | Pd-EP-SS-A-2-9 | Benzyl Cyanide | EtOH | 1 | 24 | 1 | 8 | 78 2-phenylethan-1-amine |
| 9 | Pd-EP-SS-A-2-9 | 4-nitroanisole | EtOAc | 1 | 20 | 2 | 8 | 30 4-methoxy aniline |
| 10 | Pd-EP-SS-A-2-9 | 3-nitroanisole | EtOAc | 1 | 20 | 2 | 8 | 87 3-methoxy aniline |
| 11 | Pd-EP-SS-A-2-9 | 2-nitroanisole | EtOAc | 0.5 | 20 | 1 | 4 | 100 2-methoxy aniline |
| 12 | Pd-EP-SS-A-2-9 | 4-nitrotoluene | EtOAc | 1 | 24 | 2 | 8 | 98 4-methyl aniline |
| 13 | Pd-EP-SS-A-2-9 | Azobenzene | EtOAc | 1 | 20 | 2 | 8 | 61 aniline |
| 14 | Pd-EP-SS-A-2-9 | 1-Bromo-3-nitrobenzene | EtOAc | 0.5 | 20 | 1 | 4 | 80 3-bromoaniline |
| 15 | Pd-EP-SS-A-2-9 | (E)-(3-chloroprop-1-en-1-yl)benzene | EtOAc | 0.5 | 20 | 1 | 4 | 2 propylbenzene<br>59 1-propenylbenzene |
| 16 | Pd-EP-SS-A-2-9 | 1-chloro-4-nitrobenzene | EtOAc | 0.5 | 20 | 1 | 4 | 70 4-chloroaniline |
| 17 | Pd-EP-SS-A-2-9 | 1-chloro-2-nitrobenzene | EtOAc | 0.5 | 20 | 1 | 4 | 86 2-chloroaniline |
| 18 | Pd-EP-SS-A-2-9 | 1-chloro-3-nitrobenzene | EtOAc | 0.5 | 20 | 1 | 4 | 94 3-chloroaniline |
| 19 | Pd-EP-SS-A-2-9 | 4-chloro-4-vinylbenzene | EtOAc | 0.5 | 20 | 1 | 4 | 62 1-chloro-4-ethylbenzene |
| 20 | Pd-EP-SS-A-2-9 | 4-chloro-2-nitrobenzaldehyde | EtOAc | 0.5 | 20 | 1 | 4 | 61 2-amino-4-chlorobenzaldehyde |

All reactions were run at 120° C.

Figure 15:
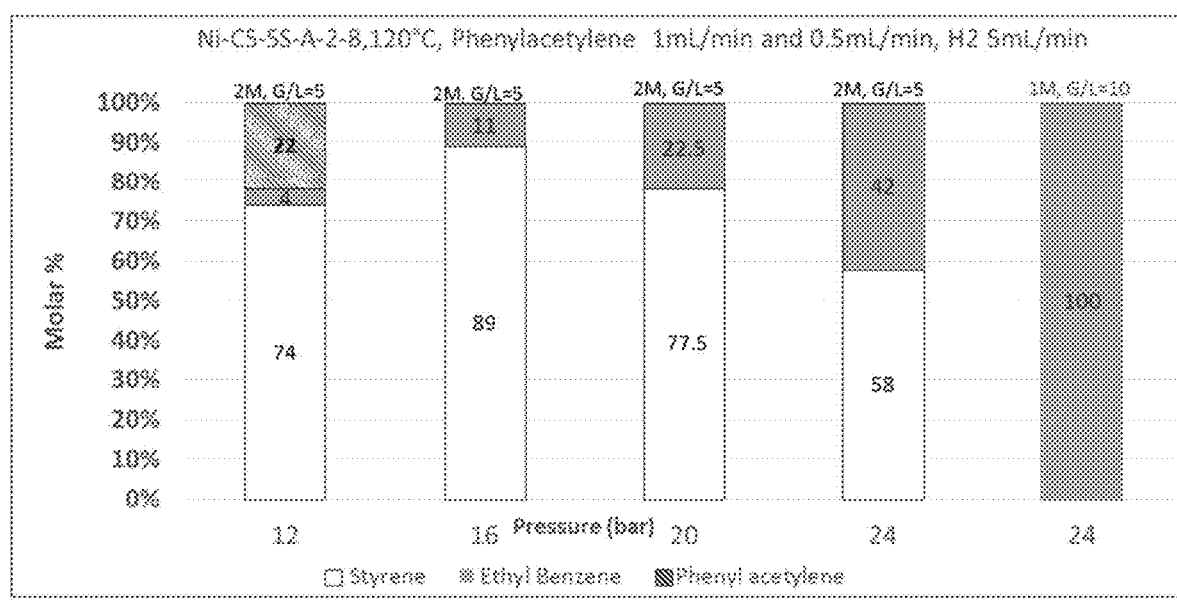
FIG. 15 shows a reduction of benzyl cyanide to phenylethylamine using a nickel cold spray coating on a stainless steel aluminium alloy (Ni-CS-SS-A-2-8) with a 0.5 mL/min liquid flow rate, 5 mL/min hydrogen gas flow rate, 24 bar at 120° C.

An example of the optimisation process is shown in FIG. 15 for the reduction of phenylacetylene to ethylbenzene (see Entry 3, Table 5). It was found that more advantageous conditions of 0.5 mL/min liquid flow rate, 5 mL/min hydrogen gas flow rate, 24 bar at 120° C. were required for 100% conversion of phenylacetylene to ethylbenzene.

Figure 16:
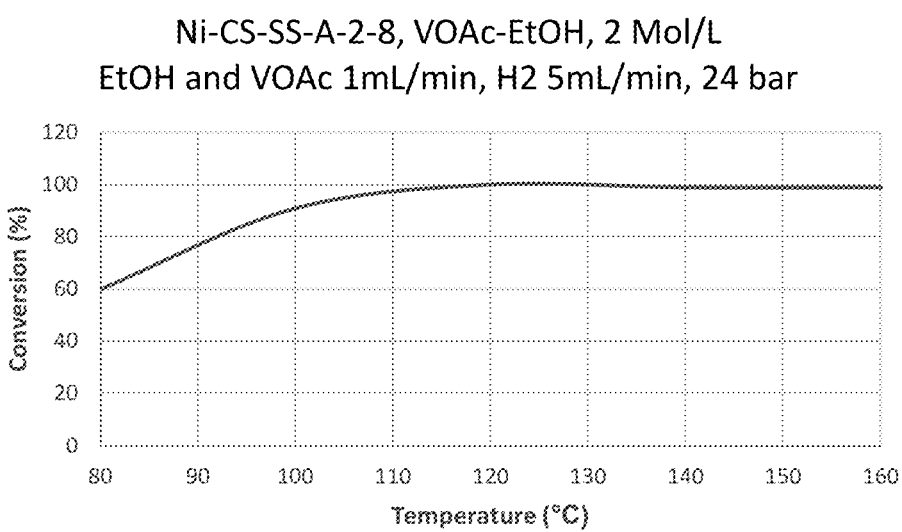
FIG. 16 shows that conversion of vinyl acetate to ethyl acetate using a nickel cold spray coating on a stainless steel aluminium alloy (Ni-CS-SS-A-2-8) and a 12-set reactor module in series with a temperature of 120° C.

FIG. 16 shows that for the conversion of vinyl acetate to ethyl acetate using Ni-CS-SS-A-2-8 and the Mark 2 reactor an optimum temperature of 120° C. was required to achieve 100% conversion (see entry 1, Table 5).

Experimental data for the hydrogenation of vinyl acetate to ethyl acetate using four CSMs in series, coated with 5% Pd/Al$_2$O$_3$ catalysts, is shown below in Table 6. The CSMs using this design have a volume displacement of 34%.

TABLE 6

Data for catalytic static mixer (CSMs) used in the hydrogenation of vinyl acetate to ethyl acetate.

| Liquid flow rate [mL/min] | Hydrogen flow rate [mL$_N$/min] | Hydrogen to substrate ratio | Reactor pressure [bar] | Conversion |
|---|---|---|---|---|
| 10 | 60 | 0.12 | 12 | 16% |
| 10 | 140 | 0.29 | 12 | 32% |
| 10 | 300 | 0.61 | 12 | 63% |
| 10 | 300 | 0.61 | 17.6 | 65% |

Leaching Experiments

To analyse potential leaching of the catalysts from the catalytic static mixers the outlet of multiple experiments was collected, concentrated and ICP-OES performed. The two following tables show catalytic static mixer leaching results when steady state appeared for both Nickle and Palladium catalysts and illustrates that there is minimal leaching of catalyst from the static mixers during reactions.

| Ni-CS-SS-A-2-8 | Cr | Fe | Ni |
|---|---|---|---|
| ppm total | 0.04 | 0.78 | 0.18 |
| Concentration (μmol/L) | 1.27 | 24.13 | 5.02 |

| Pd-EP-SS-A-2-9 | Cr | Fe | Ni | Pd |
|---|---|---|---|---|
| ppm total | 0.24 | 0.63 | 0.30 | <0.001 |
| Concentration (μmol/L) | 8.12 | 19.66 | 8.56 | <0.025 |

The invention claimed is:

1. A continuous flow chemical reactor for use in reaction of one or more fluidic reactants, the reactor comprising:

one or more reaction chamber sections in fluidic communication with each other, each reaction chamber section housing a removable, additively manufactured static mixer element configured as an integral module for insertion into each reaction chamber section, wherein the aspect ratio (L/d) of the reactor is at least about 50, each static mixer element is an elongated integral structure comprising catalytically reactive sites and an integral scaffold defining a plurality of similar, interconnected structures repeated periodically along the longitudinal axis of the scaffold to form a continuous lattice of interconnected segments, each segment comprising a plurality of apertures and passages arranged in multiple orientations to the net flow direction configured for enhancing mixing with fluid flowing through the apertures and passages of the static mixer, contact of the fluidic reactants with the catalytically reactive sites and heat transfer, by redistributing fluid in directions transverse to the net flow through the plurality of apertures and passages by changing or splitting the localized flow direction by more than 200/m, corresponding to a number of times within a given length along a longitudinal axis of the static mixer element, the volume displacement % of each static mixer element relative to each tubular reactor chamber section for housing the static mixer element being in a range of 23 to 70%, and, in use, configured to provide a transverse temperature differential of less than about 10° C./mm and a pressure drop across the reaction chamber section (in Pa/m) of less than about 100,000 with a volumetric flow rate of at least 0.1 ml/min;

one or more reactant inlets for supply of the one or more fluidic reactants to the one or more tubular chamber sections; and one or more outlets in fluidic communication with the static mixer element for receiving an output stream comprising a product of the reaction.

2. The continuous flow chemical reactor of claim 1, wherein each segment comprises apertures and passages arranged in at least three orientations within a segment.

3. The continuous flow chemical reactor of claim 1, wherein the reactor is a tubular continuous flow reactor comprising one or more tubular reaction chamber sections.

4. The continuous chemical reactor of claim 1, wherein the static mixer element is an additive manufactured static mixer element.

5. The continuous flow chemical reactor of claim 1, wherein the catalytically reactive sites are provided by at least one of: the scaffold being formed from a catalytic material; a catalyst material being intercalated, interspersed and/or embedded with at least part of the scaffold; and at least a part of the surface of the scaffold comprising a coating comprising a catalyst material.

6. The continuous flow chemical reactor of claim 1, wherein at least a part of the surface of the scaffold comprises a coating comprising a catalyst material, the coating being an electrodeposition coating or a cold spray coating.

7. The continuous flow chemical reactor of claim 1, wherein the catalytic material comprises a metal selected from at least one of iron, cobalt, copper, zinc, nickel, palladium, platinum, gold, silver, ruthenium, iridium, rhodium, titanium vanadium, zirconium, niobium, tantalum, and chromium, or a metal alloy, cermet or metal oxide thereof.

8. The continuous flow chemical reactor of claim 1, wherein the catalytic material comprises nickel or nickel alloy.

9. The continuous flow chemical reactor of claim 1, wherein the scaffold comprises or consists of a metal, metal alloy, cermet and metal oxide.

10. The continuous flow chemical reactor of claim 1, wherein the scaffold is provided in a mesh configuration having a plurality of integral units defining a plurality of passages configured for facilitating mixing of reactants and heat transfer.

11. The continuous flow chemical reactor of claim 1, wherein the scaffold is configured for operating in a turbulent flow with a Reynolds numbers (Re) of at least about 2500.

12. The continuous flow chemical reactor of claim 1, wherein the diameter (in mm) of each reaction chamber section and housed catalytically active static mixer element is in the range of 5 to 150.

13. The tubular continuous flow chemical reactor of claim 1, wherein
the aspect ratio (L/d) of the reactor is at least about 100.

14. The continuous flow chemical reactor of claim 1, wherein the aspect ratio (L/d) of the reactor is at least about 75.

15. The continuous flow chemical reactor of claim 1, wherein the aspect ratio (L/d) of each static mixer element is at least 15, and arranged in each reaction chamber section in a series of one or more static mixer elements to a total aspect ratio (L/d) of at least 50.

16. The continuous flow chemical reactor of claim 1, wherein the aspect ratio (L/d) of each static mixer element is at least 25, and arranged in each reaction chamber section in a series of one or more static mixer elements to a total aspect ratio (L/d) of at least 75.

17. The continuous flow chemical reactor of claim 1, wherein the reactor comprises a heat exchanger system to allow control of the temperature of the reactor, chamber section, catalytic static mixer, or fluidic components thereof, wherein the heat exchanger is separate to the catalytic static mixer.

18. A system for providing a continuous flow chemical reaction comprising:
a continuous flow chemical reactor according to claim 1;
a pump for providing fluidic flow for one or more fluidic reactants and any products thereof through the reactor;
one or more heat exchangers to allow for control of the temperature of the reactor, chamber section, static mixer, or fluidic components thereof, wherein the heat exchanger is separate to the catalytic static mixer; and
a controller for controlling one or more of the parameters of the system selected from concentration, flow rate, temperature, pressure, and residence time, of the one or more fluidic reactants, or sources or products thereof.

19. A process for synthesizing a product by catalytic reaction of one or more fluidic reactants, the process comprising the steps of:
providing a continuous flow chemical reactor according to claim 1 or a system according to claim 18;
providing at least a first fluidic reactant to the reactor via the one or more reactant inlets;
operating the chemical reactor, or control means thereof, to provide flow and catalytic reaction of the at least first fluidic reactant through the static mixer; and
obtaining an output stream comprising a product of a catalytic reaction of the at least first reactant.

20. The process of claim 19, wherein the pressure differential across the static mixer (in Pa/m) is less than about 10,000.

21. The process of claim 19, wherein the pressure differential across the static mixer is maintained with a volumetric flow rate of at least 1 ml/min.

22. A process for preparing a removable static mixer element for a continuous flow chemical reactor chamber, comprising the steps of:
providing a static mixer element configured as an integral module for housing within a reaction chamber section, the integral module comprising an integral scaffold defining a plurality of apertures and passages; and
applying a catalytic coating to at least a portion of the surface of the scaffold to provide the surface with a plurality of catalytically reactive sites,
each static mixer element is an elongated integral structure comprising catalytically reactive sites and an integral scaffold defining a plurality of similar structures repeated periodically along the longitudinal axis of the scaffold to form a continuous lattice of interconnected segments, each segment comprising apertures and passages arranged in multiple orientations to the net flow direction configured for enhancing mixing, contact of one or more fluidic reactants with the catalytically reactive sites, and heat transfer, by redistributing fluid in directions transverse to the net flow through the plurality of apertures and passages by changing or splitting the localized flow direction by more than 200/m, corresponding to a number of times within a given length along a longitudinal axis of the static mixer element, the volume displacement % of each static mixer element relative to a reactor chamber section for housing the static mixer element being in a range of 23 to 70%, and, in use, configured to provide a transverse temperature differential of less than about 10° C./mm and a pressure drop across the reaction chamber section (in Pa/m) of less than about 100,000 with a volumetric flow rate of at least 0.1 ml/min.

23. A static mixer element comprising catalytically reactive sites and an integral scaffold defining a plurality of similar structures repeated periodically along the longitudinal axis of the scaffold to form a continuous lattice of interconnected segments, each segment comprising apertures and passages arranged in multiple orientations to the net flow direction configured for enhancing mixing, contact of one or more fluidic reactants with the catalytically reactive sites, and heat transfer, by redistributing fluid in directions transverse to the net flow through the plurality of apertures and passages by changing or splitting the localized flow direction by more than 200/m, corresponding to a number of times within a given length along a longitudinal axis of the static mixer element, the volume displacement % of each static mixer element relative to a reactor chamber section for housing the static mixer element being in a range of 23 to 70%, wherein the static mixer element is an elongated integral structure.

24. The static mixer of claim 23, wherein each segment comprises apertures and passages arranged in at least 3 orientations within a segment.

25. The static mixer of claim 23, wherein each segment comprises polygonal prisms, helical segments or helicoid structures providing a plurality of apertures and passages.

26. The static mixer of claim 23, wherein the aspect ratio (L/d) of each static mixer element is at least 15.

27. The static mixer of claim 23, wherein the aspect ratio (L/d) of each static mixer element is at least 25.

* * * * *